US010317607B2

United States Patent
Lee et al.

(10) Patent No.: US 10,317,607 B2
(45) Date of Patent: Jun. 11, 2019

(54) OPTICAL MEMBER HAVING THREE-DIMENSIONAL EFFECT FORMING PORTION AND MULTIPLE EFFECT FORMING PORTION AND LIGHTING DEVICE USING THE SAME

(71) Applicant: LG INNOTEK CO., LTD., Seoul (KR)

(72) Inventors: Dong Hyun Lee, Seoul (KR); Jin Su Kim, Seoul (KR); Seung Jong Baek, Seoul (KR); Jae Hyuk Jang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/681,848

(22) Filed: Aug. 21, 2017

(65) Prior Publication Data
US 2017/0343725 A1 Nov. 30, 2017

Related U.S. Application Data

(63) Continuation of application No. 14/582,432, filed on Dec. 24, 2014, now Pat. No. 9,766,390.

(30) Foreign Application Priority Data

Dec. 27, 2013 (KR) .................. 10-2013-0164889

(51) Int. Cl.
*F21V 8/00* (2006.01)
*G02B 27/22* (2018.01)
(Continued)

(52) U.S. Cl.
CPC .......... *G02B 6/0038* (2013.01); *F21S 43/14* (2018.01); *F21S 43/239* (2018.01); *F21S 43/245* (2018.01);
(Continued)

(58) Field of Classification Search
CPC .. G02B 6/0035; G02B 6/0036; G02B 6/0038; G02B 6/0063; G02B 6/0058; G02B 6/006
See application file for complete search history.

(56) References Cited

U.S. PATENT DOCUMENTS 5,999,685 A 12/1999 Goto
7,085,056 B2 * 8/2006 Chen .................. G02B 6/0038
349/65
(Continued)

FOREIGN PATENT DOCUMENTS

EP 1 550 886 7/2005

OTHER PUBLICATIONS

European Search Report dated May 21, 2015 issued in Application No. 14200242.7.
(Continued)

*Primary Examiner* — Robert J May
(74) *Attorney, Agent, or Firm* — Ked & Associates, LLP

(57) ABSTRACT

Provided are an optical member capable of implementing optical images having desired shapes through a pattern design, and a lighting device using the same, the optical member including: a three-dimensional effect forming portion provided on a first surface of a base substrate; and a multiple effect forming portion disposed in a lamination form with the three-dimensional effect forming portion, wherein the three-dimensional effect forming portion has multiple main patterns sequentially arranged in a first direction on the first surface and having respective inclined surfaces with an inclination angle with respect to the first surface, wherein the multiple main patterns implement a line shaped beam of a first path by guiding a first incident beam into a first surface direction through refraction or reflection from the inclined surfaces, wherein the multiple effect forming portion are sequentially arranged in a second direc-
(Continued)

tion crossing the first direction and has multiple optical patterns.

17 Claims, 16 Drawing Sheets

(51) Int. Cl.

| | |
|---|---|
| *F21S 43/14* | (2018.01) |
| *F21S 43/239* | (2018.01) |
| *F21S 43/245* | (2018.01) |
| *F21S 43/249* | (2018.01) |
| *F21V 33/00* | (2006.01) |
| *F21Y 115/10* | (2016.01) |

(52) U.S. Cl.
CPC ............ *F21S 43/249* (2018.01); *G02B 6/006* (2013.01); *G02B 6/0058* (2013.01); *G02B 27/2221* (2013.01); *F21V 33/00* (2013.01); *F21Y 2115/10* (2016.08); *G02B 6/0068* (2013.01)

(56) References Cited

U.S. PATENT DOCUMENTS

| | | | |
|---|---|---|---|
| 7,178,966 B2* | 2/2007 | Yu | G02B 6/0038 362/626 |
| 7,206,491 B2 | 4/2007 | Feng et al. | |
| 7,269,328 B2 | 9/2007 | Tang | |
| 7,512,310 B2 | 3/2009 | Lee | |
| 8,427,603 B2* | 4/2013 | Ishikawa | G02B 6/0018 349/65 |
| 2002/0080598 A1 | 6/2002 | Parker et al. | |
| 2004/0252482 A1* | 12/2004 | Tsai | G02B 6/0016 362/612 |
| 2006/0104092 A1 | 5/2006 | Feng et al. | |
| 2008/0068862 A1 | 3/2008 | Shimura | |
| 2008/0158912 A1 | 7/2008 | Chang | |
| 2009/0092366 A1 | 4/2009 | Iwasaki | |

OTHER PUBLICATIONS

U.S. Office Action dated Aug. 22, 2016 issued in co-pending U.S. Appl. No. 14/582,432.

* cited by examiner

——— BRIGHTNESS CURVE OF FIRST EMBODIMENT
——— BRIGHTNESS CURVE OF SECOND EMBODIMENT
— — BRIGHTNESS CURVE OF THIRD EMBODIMENT
——— BRIGHTNESS CURVE OF FOURTH
······ BRIGHTNESS CURVE OF FIFTH EMBODIMENT

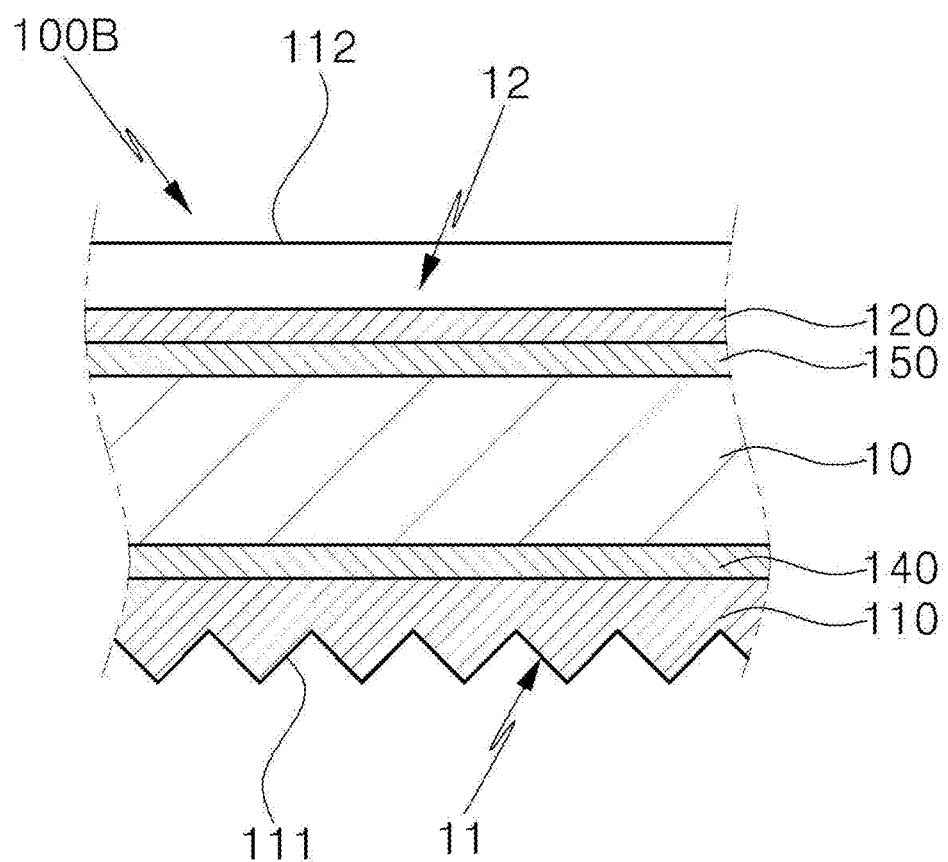

OPTICAL MEMBER HAVING THREE-DIMENSIONAL EFFECT FORMING PORTION AND MULTIPLE EFFECT FORMING PORTION AND LIGHTING DEVICE USING THE SAME

CROSS-REFERENCE TO RELATED APPLICATION

The present application is a Continuation of co-pending U.S. patent application Ser. No. 14/582,432 filed on Dec. 24, 2014, which claims priority under 35 U.S.C. § 119 to Korean Application No. 10-2013-0164889 filed on Dec. 27, 2013, in the Korean Intellectual Property Office, whose entire disclosure is hereby incorporated by reference.

BACKGROUND

1. Field

Embodiments of the present disclosure relate to an optical member and a lighting device using the same capable of implementing an optical image having a desired shape via a pattern design.

2. Background

In general, a lighting device is a device used for lightening a dark place using various light sources. The lighting device is used to shine a beam at a specific object or space and to express an atmosphere of the specific object or space in a desired shape or color.

According to the technical development of an LED (Light Emitting Diode), lighting devices in various shapes using the LED have recently come into wide use. For example, one of the lighting devices according to a conventional art includes a diffusion plate for emitting light emitted from LED light sources to the outside.

Most of the LED lighting devices according to the conventional art are configured so that light is uniformly outputted on an entire light emitting surface. Also, in order to express the atmosphere of a specific object or space in a desired shape or color, a color filter or a filter having a light permeable hole in a desired shape has been used in some lighting devices according to the conventional art.

However, when the atmosphere of a specific object or space is expressed in a desired shape or color using the LED lighting devices according to the conventional art, the configuration of the devices becomes mechanically complicated, and as a result, it is problematic in that the degree of freedom in design is limited, and it is difficult to install or maintain and manage the devices. As such, in order to express the atmosphere in a desired shape or color or an optical image, a light device having a simple structure, which is easy to install or maintain and manage, has been required.

BRIEF DESCRIPTION OF THE DRAWINGS

The embodiments will be described in detail with reference to the following drawings in which like reference numerals refer to like elements wherein:

FIG. 24 is a partially cross-sectional view of an optical member according to a further embodiment of the present disclosure.

DETAILED DESCRIPTION

Figure 1:
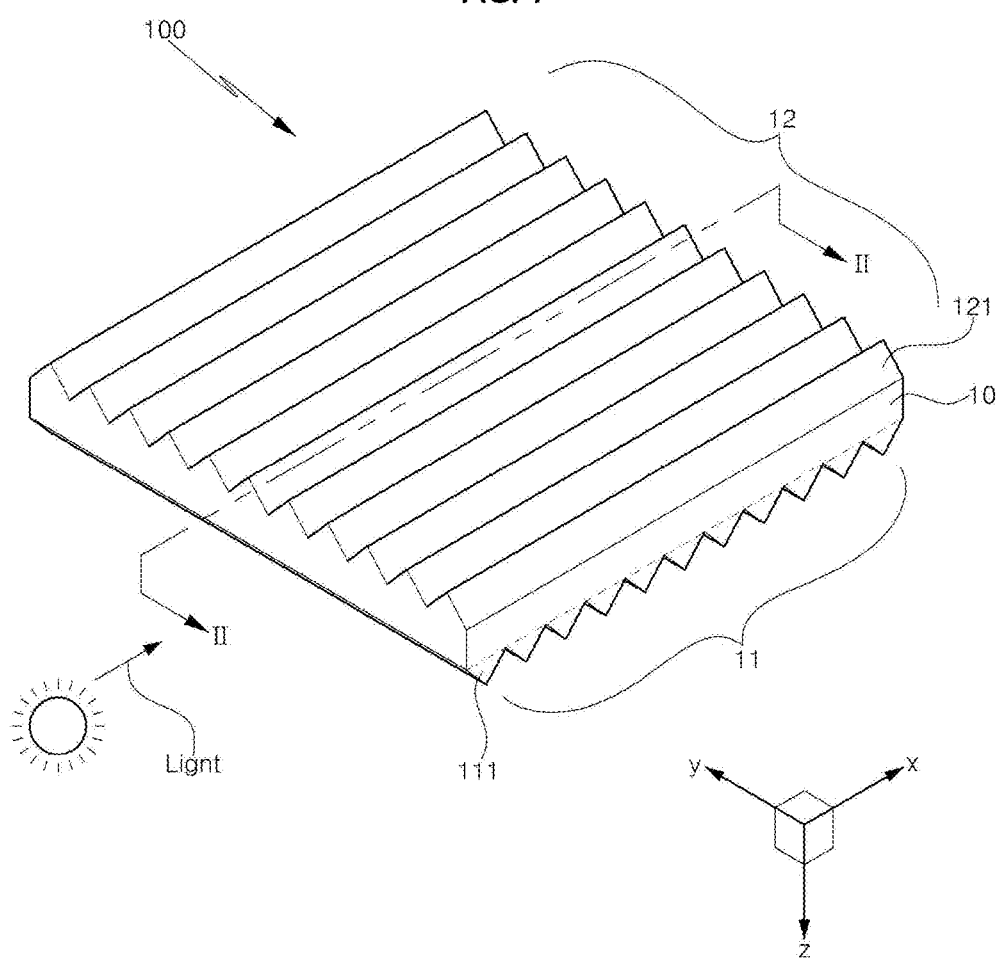
FIG. 1 is a perspective view of an optical member according to an embodiment of the present disclosure.

Hereinafter, the embodiments of the present disclosure that an ordinary person skilled in the art can implement will be described with reference to the accompanying drawings. The embodiments in the specification and the constructions shown in the drawings are provided as a preferred embodiment of the present disclosure, and it should be understood that there may be various equivalents and modifications which could substitute at the time of filing. In addition, when it comes to the operation principle of the preferred embodiments of the present disclosure, when the known functions or functions are seemed to make unclear the subject matters of the present disclosure, they will be omitted from the descriptions of the disclosure. The terms below are defined in consideration of the functions of the present disclosure, and the meaning of each term should be interpreted by judging the whole parts of the present specification, and the elements having the similar functions and operations of the drawings are given the same reference numerals.

FIG. 1 is a perspective view of an optical member according to an embodiment of the present disclosure.

Referring to FIG. 1, an optical member 100 according to the present embodiment is configured to include: a base substrate 10; a three-dimensional effect forming portion 11; and a multiple effect forming portion 12.

The base substrate base substrate 10 is provided in a transparent plate form or a film form and has both surfaces, namely, a first surface and a second surface. The first surface may be referred to as a first pattern arrangement surface, and the second surface may be referred to as a second pattern arrangement surface.

The three-dimensional effect forming portion 11 is provided on the first surface of a lower side of the base substrate 10, and the multiple effect forming portion 12 is provided on the second surface of an upper side of the base substrate 10.

A transparent material, for example, a polymer which is easy to manufacture and handle, may be used as a material of the base substrate 10. The polymer includes a thermoplastic polymer, a thermosetting polymer or a photocurable polymer. The polymer may be selected from polycarbonate, polymethylmethacrylate, polystyrene, polyethylene terephthalate and the like. Also, a transparent material such as glass and the like may be used as the material of the base substrate 10. As a transparent material, the base substrate 10 may have a light transmittance beyond a predetermined value or a haze of 2% or less.

The three-dimensional effect forming portion 11 is configured to include the multiple main patterns 111 provided on the first surface of the base substrate 10. The multiple main patterns 111 have multiple convex structures or multiple concave structures that are roughly parallel to the first surface and extend in roughly a first direction (y-direction), respectively. That is, the three-dimensional effect forming portion 11 is configured to include multiple main patterns 111 that are roughly parallel to the first surface and are sequentially arranged in a second direction (x-direction) which crosses at right angles to the first direction. The multiple main patterns 111 have inclined surfaces (see reference numeral 113 of FIG. 3) with each inclination angle with respect to the first surface or a surface or straight line vertical to the first surface.

The multiple effect forming portion 12 is provided in a lamination form with the three-dimensional effect forming portion 11. In the present embodiment, the multiple effect forming portion 12 is configured to include multiple optical patterns 121 provided on the second surface of the base substrate 10. The multiple optical patterns 121 have multiple convex structures or multiple concave structures that are roughly parallel to the second surface and extend in roughly a second direction (x-direction), respectively. That is, the multiple effect forming portion 12 is configured to include the multiple optical patterns 121 that are roughly parallel to the second surface and are sequentially arranged in the first direction (y-direction) which crosses at right angles to the second direction.

According to a pattern design of the multiple main patterns 111, when light is irradiated to the optical member 100, the multiple main patterns 111 of the three-dimensional effect forming portion 11 implements a line-shaped beam of a first path which crosses at right angles to pattern extension directions by guiding a first incident beam to a first surface direction toward which the first surface looks or a second surface direction toward which the second surface of the base substrate 10 opposite to the first surface looks using refraction and reflection generated from the inclined surfaces.

Also, according to a pattern design of the multiple optical patterns 121, when light is irradiated to the optical member 100, a single line-shaped beam or a single three-dimensional effect beam emitted from the multiple main patterns 111 of the three-dimensional effect forming portion 11 may be converted into multiple line-shaped beam or multiple three-dimensional effect beam.

The principles of generation of the single line-shaped beam, the single three-dimensional effect beam, the multiple line-shaped beams and the multiple three-dimensional effect beams will be described in greater detail with reference to the drawings.

Figure 2:
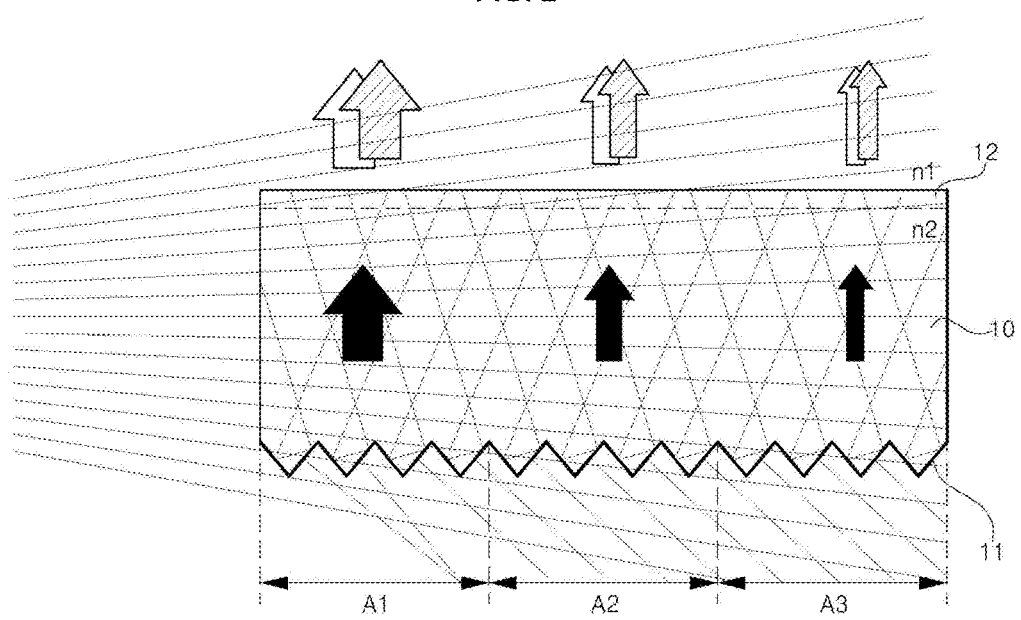
FIG. 2 is a cross-sectional view taken along line II-II of the optical member of FIG. 1.
Figure 3:
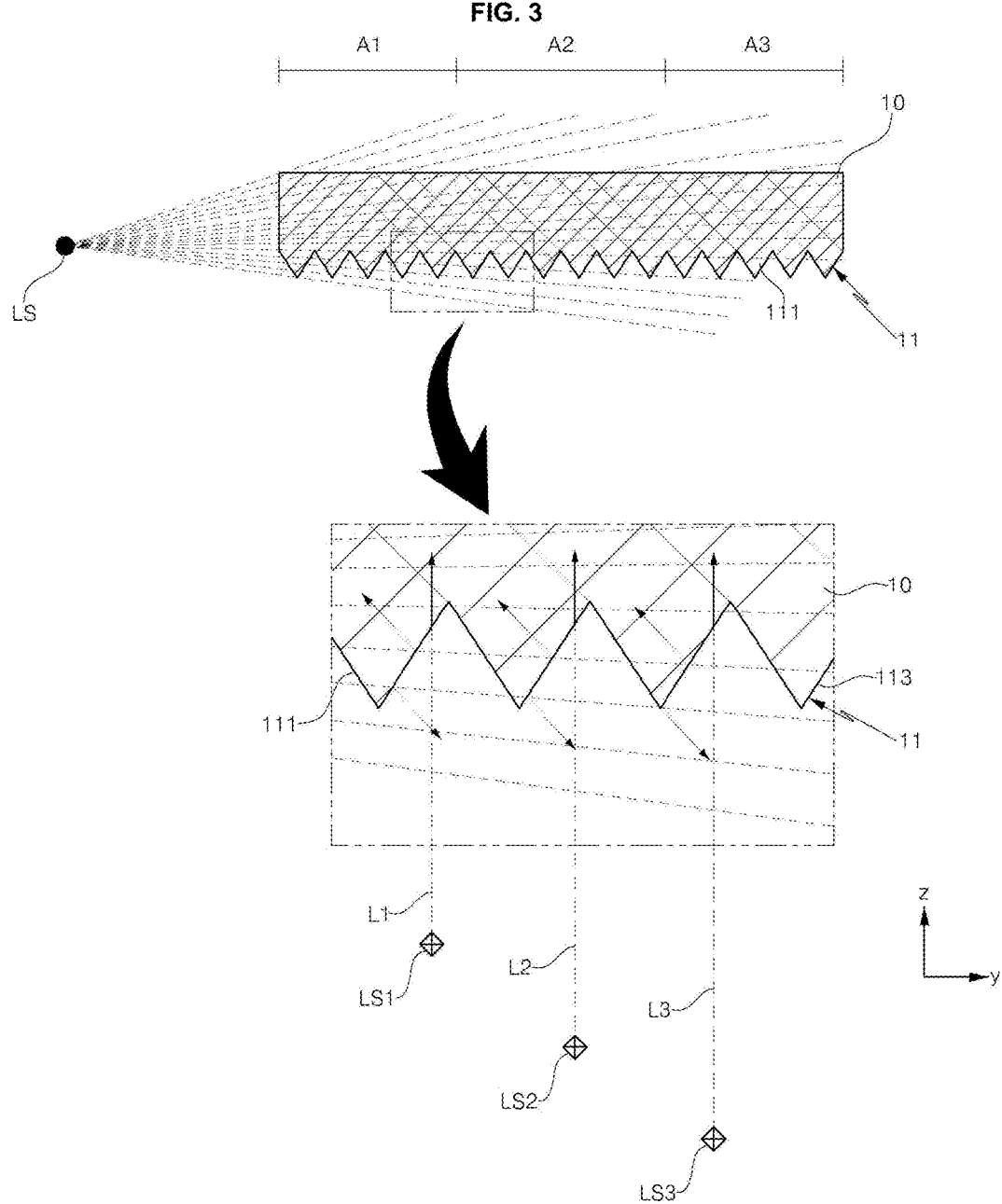
FIG. 3 is a partially cross-sectional view of the optical member of FIG. 1 and a partially enlarged view thereof.

FIG. 2 is a cross-sectional view taken along line II-II of the optical member of FIG. 1. FIG. 3 is a partially cross-sectional view of the optical member of FIG. 1 and a partially enlarged view thereof. For convenience of the description, the optical member of FIG. 3 is illustrated in a state of the multiple effect forming portion being omitted.

Referring to FIGS. 2 and 3, when light is irradiated from a predetermined light source of a left side of the ground to the optical member of the present embodiment, the multiple main patterns 111 of the three-dimensional effect forming portion, that have a larger refractive index n2 than a refractive index n1 of air and are provided on the first surface of the base substrate 10, refract and reflect light from the inclined surfaces.

In the aforesaid case, the light passing through the multiple main patterns 111 of the three-dimensional effect forming portion 11 is guided into a specific optical path and is limited to a specific optical width by refraction and reflection generated from the inclined surfaces of the main patterns according to a pattern design of the main patterns. The specific optical path refers to a moving path of light guided in a direction which crosses at right angles to the extension direction of each of the main patterns. The optical path includes a first path in which the light moves along a sequential arrangement direction of the main patterns. The generation of this optical path is based on the Fermat's principle that a ray of light passing along the three-dimensional forming portion 21, namely, a ray of light passing along a medium, travels along a movement path that can be traversed in the least time. Furthermore, the specific optical width may be limited in a desired shape through a pattern design of main patterns for controlling pattern conditions, such as a between adjacent two main patterns and the like. For example, the specific optical path and the specific optical width may be implemented to extend to the extent of a first length while having a fixed width according to a pattern design, may be implemented to extend to the extent of a second length shorter than the first length while having an optical width which reduces gradually, or may be implemented to be similar to the first length or to be shorter or longer than the first length while having an optical width which increases gradually.

Also, by refraction and reflection of the inclined surfaces, the multiple main patterns 111 of the three-dimensional effect forming portion 11 may function as indirect light sources in which brightness reduces as a distance L1, L2, L3 from the light source increases gradually as viewed from the outside of the base substrate 10. That is, the indirect light sources generated from a specific portion of the multiple main patterns refer to dummy light sources LS1, LS2, LS3 which are sequentially arranged along the optical path of the light source, and in which the intensity of light reduces as a distance from the light source increases gradually. Here, the specific portion corresponds to a portion where each of the inclined surfaces of the main patterns crosses at right angles to the light of the light source.

More specifically, as illustrated in FIG. 3, the multiple patterns 111 serve as indirect light sources in which optical paths become longer in order as a distance from the light source LS increases gradually, thereby creating a three-dimensional effect beam in a thickness direction (z-direction) of the base substrate 10. The thickness direction of the base substrate 10 may be a direction which crosses at right angle to a pattern extension direction (x-direction) and a first direction (y-direction).

In other words, when the multiple patterns 111 include first patterns, second patterns and third patterns in a first area A1, a second area A2 and a third area A3 sequentially arranged from the light source LS, a second optical path of the second patterns is longer than a first optical path of the first patterns and is shorter than the third optical path of the third patterns, a second distance L2 from a second dummy light source LS2 of the light source by inclined surfaces of the second patterns to the inclined surfaces of the second patterns is longer than a first distance L1 from a first dummy light source LS1 of the light source by inclined surfaces of the first patterns to the inclined surfaces of the first patterns, and is shorter than a third distance L3 from a third dummy light source LS3 of the light source by inclined surfaces of the third patterns to the inclined surfaces of the third patterns. According to such a configuration, the multiple pattern 111 implement three-dimensional effect beams showing a form in which optical paths increases as a distance from the light source increases gradually in a length direction of the line shape beam, and accordingly, as viewed from an arbitrary point (a standard point or an observing point) in a direction roughly vertical to the first surface or the pattern arrangement surface (see reference numeral 112 of FIG. 9), the distance from the light sources increases as the optical path increases gradually.

Referring to FIG. 2 again, the multiple main patterns of the multiple effect forming portion 12 are configured to include the multiple optical patterns disposed in a lamination form with the multiple main patterns. The multiple optical patterns may be provided in the same structure and the same form as those of the multiple main patterns except for the fact that extension directions of the multiple optical patterns cross the extension directions of the multiple main patterns or meet at right angles to the extension directions of the multiple main patterns. According to this configuration, the multiple optical patterns may convert a line-shaped beam or a three-dimensional effect beam of the first path, refracted and reflected from the multiple main patterns into a first line-shaped beam (or a first three-dimensional effect beam) and a second line-shaped beam (or a second three-dimensional effect beam) which cross the first path in different directions.

According to the optical member of the present embodiment, a single line-shaped beam or a single three-dimensional effect beam may be implemented by the three-dimensional effect forming portion 11, and the single line-shaped beam or the single three-dimensional effect beam may be converted into multiple line-shaped beams or multiple three-dimensional effect beams by the multiple effect forming portion 12.

Meanwhile, according to the embodiment, the second main patterns may be patterns positioned right after first main patterns on the pattern arrangement surface 112 as viewed from the light source LS or may be patterns positioned with the first main patterns and other main patterns in a predetermined number therebetween. Similarly, third main patterns may be patterns positioned right after the second main patterns on the pattern arrangement surface as viewed from the light source LS or may be patterns positioned with the second main patterns and other main patterns in a predetermined number therebetween.

Also, the aforesaid three-dimensional effect beam may refer to an optical image having a sense of distance or a perceptional depth, which is configured such that a line-shape beam of a predetermined optical path (the first path) gradually enters the base substrate 10, namely, from the first surface of the base substrate 10 toward the second surface of the base substrate 10, as viewed from the first surface direction or the second surface direction. Furthermore, the three-dimensional effect beam may be one example of a line-shaped beam and may be another name for a specific optical image of the line-shaped beam.

Also, according to the present embodiment, the aforesaid multiple main patterns 111 and the multiple optical patterns are provided by removing a part of the first surface and a part of the second surface of the base substrate 10, but the present disclosure is not limited to the configuration. That is, according to some embodiments, the multiple main patterns 111 may be provided by a separate pattern layer bonded to the first surface of the base substrate 10.

Figure 4:
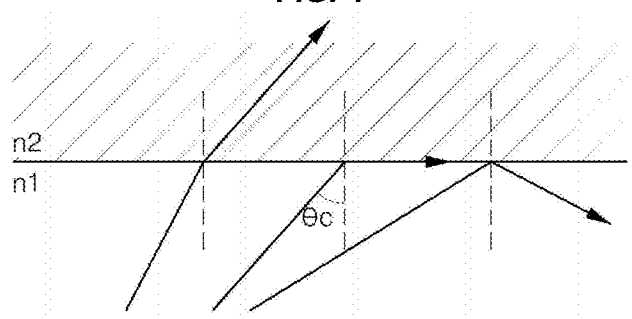
FIG. 4 is a view for explaining the principles of refraction and reflection of the optical member of FIG. 1.

FIG. 4 is a view for explaining the principles of refraction and reflection of the optical member of FIG. 1.

Referring to FIG. 4, the light, which meets with the inclined surfaces (see reference numeral 113 of FIG. 9) of the respective main patterns 111 of the three-dimensional effect forming portion 11 shown in FIG. 3, is refracted or is reflected according to an incidence angle thereof. That is, when the incidence angle is smaller than a critical angle θc, the light is refracted according to a difference in refractive index while penetrating the main patterns. When the incidence angle is greater than a critical angle θc, the light is reflected from the main patterns.

A relation between the refractive index and the critical angle may be represented by following Equations 1 and 2.

$$n = \frac{n1}{n2} = \frac{\sin\theta_c}{\sin 90°} \qquad \text{Equation 1}$$

$$\sin\theta_c = \frac{n1}{n2} \qquad \text{Equation 2}$$

Here, when n1 is a refractive index of air, n2 is a refractive index of a medium (base substrate), a critical angle is represented by the following Equation 3.

$$\sin\theta_c = \frac{1}{n2} \qquad \text{Equation 3}$$

When the principle of the reflection and refraction from the inclined surfaces is used, the inclined surface 113 of each of the multiple main patterns guides an incident beam in a first surface direction toward which the first surface of the base substrate 10 looks and/or in a second surface direction toward which the second surface 102 opposite to the first surface looks, by refracting and reflecting the incident beam according to each inclination angle θc. To do so, the inclined surface of each of the multiple patterns is provided to have a predetermined surface roughness in order implement optical images having desired shape through a pattern design.

That is, when using the multiple main patterns for guiding the beam in the first surface direction or the second surface direction by refracting and reflecting the incident beam via the inclined surface having the predetermined surface roughness, the optical path, the optical width, luminous intensity of the incident beam may be controlled, and accordingly, line shaped beams, three-dimensional effect beams or line shaped beams with a three-dimensional effect having desired shapes may be implemented.

In the present embodiment, the inclined surface (see reference numeral 113 of FIG. 8) may be a mirror-like finishing surface. Also, the inclined surface may be a precision processing surface. In other words, with regard to the surface roughness of the inclined surface, even though there is a slight difference according to each processing method, a roughly center line average roughness or an arithmetic mean roughness Ra may be about 0.02 or less, and a maximum height roughness Rmax may be about 0.3. According to some embodiments, the surface roughness of the inclined surface 113 may be a ten point median height Rz of 0.8 or less. Here, the unit of roughness may be μm and a standard length may be 0.25 mm The surface roughness of the inclined surface is intended to secure a reflectance of the inclined surface in a range beyond a predetermined value. When the surface roughness shows a larger surface roughness than the value described above, it is difficult to properly implement a line shaped beam due to the scattering of light or light beyond a fixed amount returning from the inclined surface to the light source.

According to the present embodiment, a refractive index and an critical angle may be changed according to a material of the base substrate, and thus a single line-shaped beam or a three-dimensional effect beam resulting from a single light source may be implemented by appropriately designing a structure (inclined surfaces and the like) or arrangement of the main patterns 111 of the three-dimensional effect forming portion 11 and controlling the efficiency of refraction and reflection from the multiple main patterns 111, and the single line-shaped beam or the three-dimensional effect beam may be converted into multiple line-shaped beams or multiple three-dimensional effect beams via the optical patterns (reference numeral 121 of FIG. 1) of the multiple effect forming portion 12.

Figure 5:
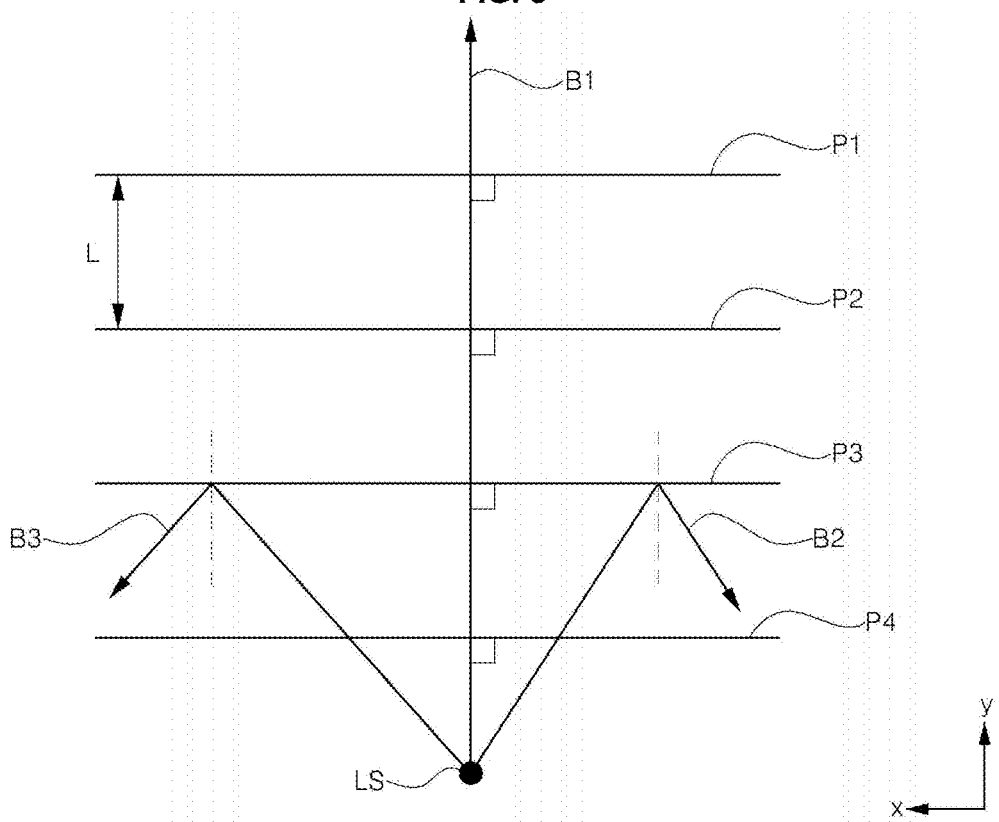
FIG. 5 is a view for explaining the principle of generation in a line-shaped light beam of the optical member of FIG. 1.

FIG. 5 is a view for explaining the principle of generation in a line-shaped light beam of the optical member of FIG. 1. FIG. 5 may correspond to a partially enlarged view of the multiple main patterns when viewing the three-dimensional effect forming portion 11 of the base substrate 10 on a plane.

Referring to FIG. 5, when the multiple main patterns are sequentially arranged from the light source LS in the y-direction, light (first incident beam) of the light source LS is implemented as a line-shaped beam B1 that travels in a direction crossing at right angles to the pattern extension directions P1, P2, P3, P4 of the multiple main patterns. A distance Lp (which may correspond to a pitch) between two adjacent main patterns may be about 10 to 500 μm This distance Lp is based on a minimum distance and a maximum distance for forming a line shaped beam or a three-dimensional effect beam, and when the distance is beyond the range, it is difficult to implement a line-shaped beam or a three-dimensional effect beam.

Also, according to implementation of the line shaped beam through a pattern design, the multiple main patterns guides the second incident beam in a direction expect for the first path by refraction and reflection from the inclined surfaces. Here, among beams from the light source LS toward the inclined surfaces, the second incident beam may be a beam (hereinafter referred to as 'an ambient beam') that meets with the inclined surfaces having an incidence angle corresponding to a direction (for example, a direction toward a first quadrant and a fourth quadrant of both sides of the line-shape beam in the first path that travels to an +y axis on an xy plan based on the light source) roughly between a +y direction and a +x direction, and a +y direction and a −x direction on a plan defined by the pattern extension directions and the first path, and is refracted or is regularly reflected by the inclined surfaces. In this case, since the second incident beam is dispersed in a relatively wide range by the inclined surfaces, as viewed from an arbitrary point (a standard point, an observing point and the like) on a straight line crossing the xy plan (corresponding to the first surface or the second surface of the base substrate), the second incident beam becomes ambient beams B2, B3 in which brightness of the periphery of a bright part is relatively low compared to that of a line shaped beam part (hereinafter referred to as "the bright part) resulting from the first incident beam.

According to the present embodiment, each of the pattern extension directions P1, P2, P3, P4 of the main patterns may be a direction in which a specific straight line of each inclined surface of the multiple main patterns extends or a direction in which a specific tangent line in contact with a curved line of each inclined surface extends. The respective pattern extension directions P1, P2, P3, P4 may be parallel to the first surface of the base substrate.

That is, when the respective pattern extension directions P1, P2, P3, P4 of the multiple main patterns are designed to be parallel to each other upon designing the pattern extension directions, the optical path (the first path) of light passing through the multiple main patterns has a straight line form in which the light starts from a main pattern which first meets with incident beam of the light source, and travels in a direction which crosses at right angles to each pattern extension direction.

Also, according to some embodiments, when the respective pattern extension directions P1, P2, P3 P4 of the multiple main patterns are designed to cross each other from at least one point or to extend in a radial direction (see FIG. 7), the optical path (the first path) of light passing along the multiple main patterns may be implemented in a curved line form in which the light start from a main pattern of a point which first meets with the light of the light source and is bent to a side in which a distance between the adjacent main patterns reduces gradually.

Figure 6:
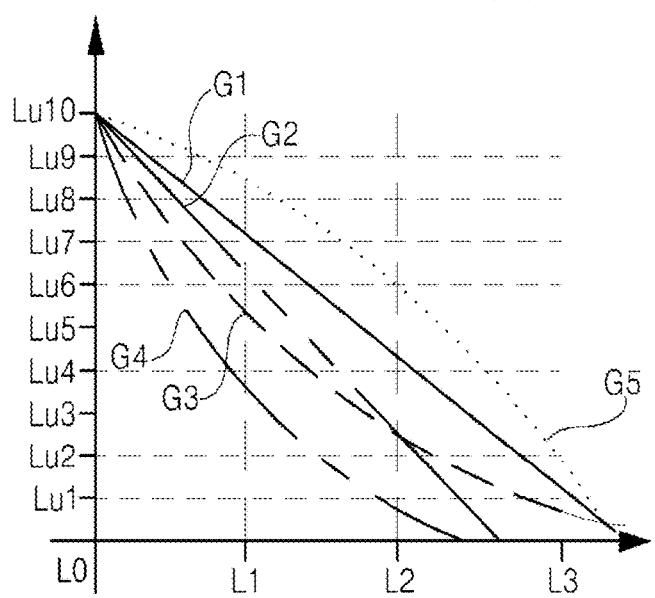
FIG. 6 is a view showing brightness for each area regarding a three-dimensional effect light beam of the optical member of FIG. 1.

FIG. 6 is a view showing brightness for each area regarding a three-dimensional effect light beam of the optical member of FIG. 1.

Referring to FIG. 6, with regard to the multiple main patterns of the optical member according to the present embodiment, by dividing the multiple main patterns sequentially arranged from the light source into the main patterns of three areas (see A1, A2, and A3 of FIG. 3), when brightness resulting from reflection and refraction of the main patterns of the respective areas has been reviewed, each of the multiple main patterns have brightness in ranges different from each other according to each distance from the light source.

In other words, when the multiple main patterns are divided into the first main patterns of the first area A1, the second main patterns of the second area A2, and the third main patterns of the third area A3 (see FIG. 3), a second brightness of the second main patterns is lower than a first brightness of the first main patterns, and is higher than a third brightness of the third main patterns. Here, a second distance L2 between the light source and the main pattern farthest away from the light source among the second main patterns is longer than a first distance L1 between the light source and the main pattern farthest away from the light source among the first main patterns and is shorter than a third distance L3 between the light source and the main pattern farthest away from the light source among the third main patterns.

More specifically, when a maximum brightness of the closest main pattern to the light source is level 10 Lu10, the specific first main pattern positioned at the first distance L1 from the light source may have a brightness of about level 8 Lu8, level 7 Lu7, level 6 Lu6, level 5 Lu5 or level 4 Lu4 according to different pattern designs of the first to fifth embodiment. The specific second main pattern positioned at the second distance L2 from the light source may have a brightness of about level 6 Lu6, level 4 Lu4, level 2 Lu2, or level 1 Lu1 according to pattern designs. Furthermore, the specific third main pattern positioned at the third distance L3 from the light source may have a brightness of about level 2 Lu2, level 1 Lu1, or level 0 (no brightness).

That is, with regard to the multiple main patterns of the optical member 100 previously described with reference to FIGS. 1 to 3, the respective multiple main patterns emit beams having predetermined brightness by refracting and reflecting the beams of the light sources, and this is because the multiple main patterns serve as indirect light sources having different kinds of brightness which are sequentially reduced according to a pattern design or an arrangement structure.

Referring to FIG. 6 again, for example, as shown in a brightness curve G1 of a first embodiment, according to a predetermined pattern design of the first embodiment, the first patterns, the second patterns and the third patterns serve as indirect light sources having brightness values of about level 7, level 4 and level 1, respectively. According to this configuration, as a distance from the light source increases gradually, the multiple main patterns may implement three-dimensional effect beams having brightness values which are substantially regularly reduced. In order to implement the three-dimensional effect beams, the multiple main patterns may be designed in a fixed pitch.

Also, according to a pattern design of the main patterns of a second embodiment, as shown in brightness curve G2 of the second embodiment, the first patterns, the second patterns and the third patterns serve as indirect light sources having brightness values of about level 6, level 3 and level 0, respectively. According to this configuration, the multiple main patterns may implement three-dimensional effect beams having brightness values which are regularly rapidly reduced as a distance from the light source increases gradually. In order to implement the three-dimensional effect beams, the multiple main patterns may be designed such that as a distance from the light source increases gradually, a pitch reduces or a pattern density per a unit length increases at a fixed rate.

Also, according to a pattern design of a third embodiment, as shown in a brightness curve G3 of the third embodiment, the first patterns, the second patterns and the third patterns serve as indirect light sources having respective brightness values of about level 5, level 2, and level 1. According to such a configuration, the multiple patterns may implement three-dimensional effect beams in which a brightness reduction rate between the first area A1 and the second area A2 is larger than a brightness reduction rate between the second area A2 and the third area A3 as a distance from the light source increases gradually. In order to implement the three-dimensional effect beams, the multiple patterns may be designed in a fixed pitch which is narrower than the pitch of the first embodiment, or may be provided such that a pitch is gradually increased according to an increase in distance from the light source.

Also, according to a pattern design of a fourth embodiment, as shown in a brightness curve G4 of the fourth embodiment, the first patterns, the second patterns and the third patterns serve as indirect light sources having respective brightness values of about level 4, level 1, and level 0. According to such a configuration, the multiple main patterns may implement three-dimensional effect beams in which brightness is further rapidly reduced relatively compared to the case of the third embodiment. In order to implement the three-dimensional effect beams, the multiple main patterns may be designed in a fixed pitch narrower than the pitch of the third embodiment, or may be provided such that a pitch is gradually reduced according to an increase in distance from the light source.

Also, according to a pattern design or an arrangement structure of a fifth embodiment, as shown in a brightness curve G3 of the fifth embodiment, the first patterns, the second patterns and the third patterns serve as indirect light sources having respective brightness values of about level 8, level 6, and level 2. According to such a configuration, the multiple patterns may implement three-dimensional effect beams in which a brightness reduction rate between the first area A1 and the second area A2 is smaller than a brightness reduction rate between the second area A2 and the third area A3 as a distance from the light source increases gradually. In order to implement the three-dimensional effect beams, the multiple main patterns may be designed in a fixed pitch which is wider than the pitch of the first embodiment, or may be provided such that a pitch is gradually reduced according to an increase in distance from the light source.

In the aforesaid first to five embodiments, it is assumed that the respective embodiments are identical to each other with respect to the pattern structures and reflection abilities of the inclined surfaces of the respective main patterns for the respective embodiments. When there is a difference in the pattern structures and the reflection abilities among the patterns, by adjusting a pattern design in consideration of this fact, three-dimensional effect beams having brightness which is naturally reduced may be obtained by the indirect light source effects of the multiple main patterns sequentially arranged.

According to the present embodiment, thanks to the effect of the reduction in brightness and the effect of the indirect light sources of the main patterns resulting from a difference in a distance from the light source, namely, a difference in optical paths, a line shaped beam, a three-dimensional effect beam or a line-shaped beam with a three-dimensional effect can be implemented.

Figure 7:
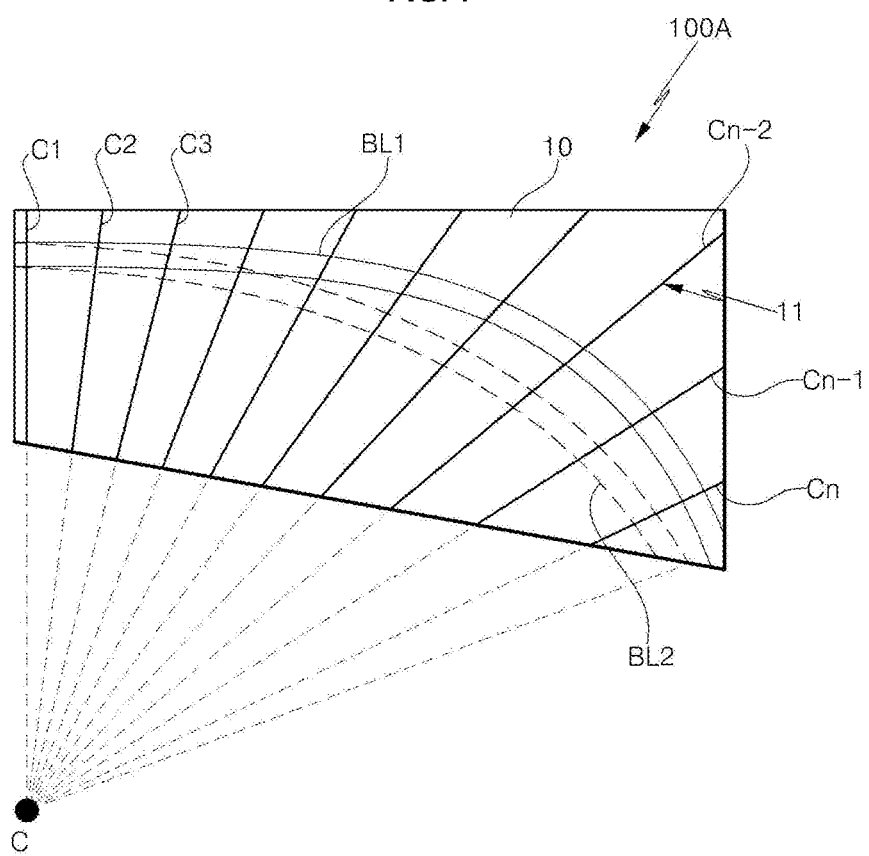
FIG. 7 is a plan view of an optical member according to another embodiment of the present disclosure.

FIG. 7 is a plan view of an optical member according to another embodiment of the present disclosure.

Referring to FIG. 7, the three-dimensional effect forming portion 11 of the optical member according to the present embodiment is configured to include the multiple main patterns provided in a structure in which pattern arrangement directions cross each other from the pattern arrangement surface of the base substrate 10. The multiple main patterns include a first main pattern C1, a second main pattern C2, a third main pattern C3, an n-second main pattern Cn-2, an n-first main pattern, and an nth main pattern Cn in order of the location nearest to the light source. Here, n is a natural number of 6 or more.

In the present embodiment, the multiple main patterns are arranged to extend in directions which are not parallel to each other. That is, with regard to the respective pattern extension directions of the multiple main patterns, virtual extension lines thereof may meet at one point of intersection C.

According to the present embodiment, when light of the light source passes through the three-dimensional effect forming portion 11, the multiple main patterns may implement a line-shaped beam BL1 of the first path (optical path) which is bent with a curvature to a side in which the pattern extension directions cross each other, namely, a side in the which an intersecting point C is present. This is because the light travels along a direction meeting at right angles to each of the pattern extension direction of the multiple main patterns according to the Fermat's principle that 'a ray of light traveling in a medium travels along a movement path that can be traversed in the least time.'

Also, according to the present embodiment, when an observing point or a fixed standard point of an observer (a person, a camera or the like) who observes the line shaped beam BL1 of the first path is moved from a first point Pa to a second point Pb, the multiple main patterns expresses a line shaped beam BL2 traveling along another optical path instead of the line shaped beam BL1 traveling along the first path. This is because the position of the first path meeting at right angles to the pattern extension directions of the multiple main patterns is moved to a direction opposite to the movement direction of the standard point according to a change of the standard point. As such, the multiple main patterns may implement the line-shaped beam having various optical images expressed by moving along the pattern extension directions of the multiple main patterns according to a standard point or an observing point.

Also, according to the present embodiment, the line-shaped beam BL1 or BL 2 of a single optical path may be implemented as a first line-shaped beam and a second line-shaped beam of two different optical paths by the multiple effect forming portion disposed in a lamination structure with the three-dimensional effect forming portion 11, even though this is not illustrated in the drawings for convenience of the description.

Figure 8:
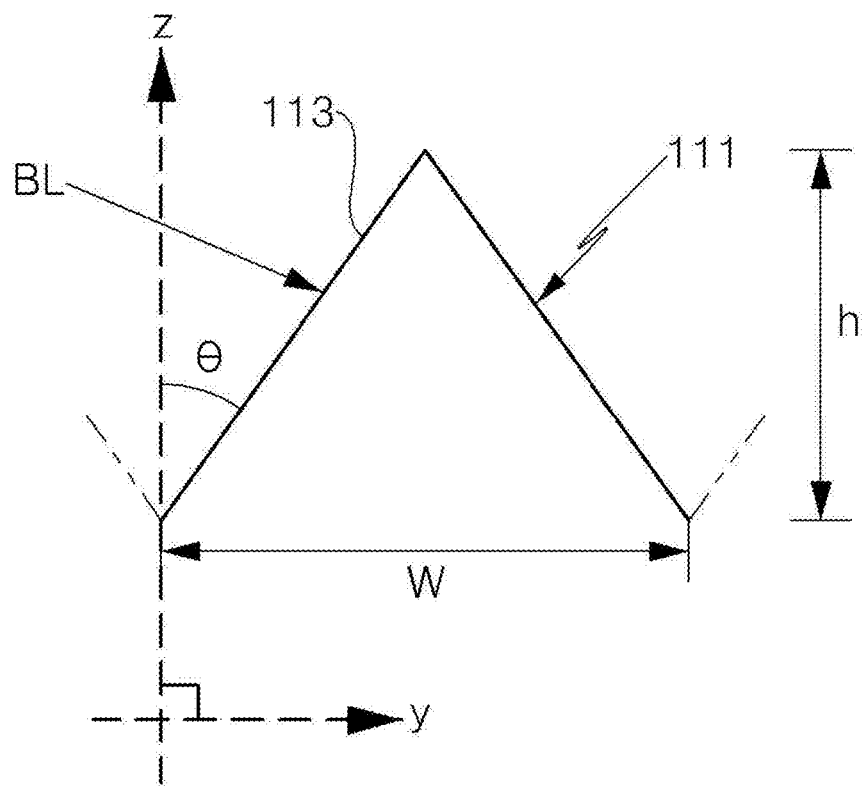
FIG. 8 is a partially enlarged view of main patterns which can be applied to the optical member according to the embodiment of the present disclosure.

FIG. 8 is a partially enlarged view of main patterns which can be applied to the optical member according to the embodiment of the present disclosure.

Referring to FIG. 8, the main pattern 111 of the three-dimensional effect forming portion according to the present embodiment may be provided so as to have a pattern structure of a triangular section form. When the main pattern 111 has the triangular section structure, the inclined surface 113 has a predetermined inclination angle in the y-direction of the pattern arrangement surface (see reference numeral 112 of FIG. 9). In other words, the inclined surface 113 may be provided to be bent at a predetermined inclination angle θ with respect to a direction (z-direction) which crosses at right angles to the pattern arrangement surface.

The inclination angle θ is larger than about 5° and smaller than about 85°. The inclination angle θ may be further limited in consideration of a refractive index of the base member, but the inclination angle may be basically appropriately designed in the range of about 5° to 85° in terms of an inclination angle which enables reflection and refraction from the inclined surface.

In one embodiment, when a refractive index of the base substrate is about 1.30 to 1.80, an inclination angle of the inclined surface 113 of each main pattern 111 may be larger than 33.7° and smaller than 50.3°, or may be larger than 49.7° and smaller than 56.3° according to each standard direction.

Also, in another embodiment, the base substrate or the multiple main patterns may be made of a material having a high refractive index. For example, in the case of manufacturing high intensity LEDs, when a ray of light having a specific incidence angle penetrates a capsule material by passing along a semiconductor die, total internal reflection is performed due to a difference in an n value (a refractive index) between the semiconductor die (n=2.50~3.50) and a general polymeric capsule element (n=1.40~1.60), and accordingly, light extraction efficiency of the device is reduced. Thus, in order to properly solve this problem, a high refractive index polymer (n=1.80~2.50) is used. In the present embodiment, the multiple main patterns may be provided by utilizing the high refractive index polymer (n=1.80~2.50) used in manufacturing high intensity LEDs. In this case, the inclination angle of the inclined surface 113 of each main pattern 111 may be larger than 23.6° and smaller than about 56.3° according to each refractive index of the multiple main patterns.

Also, according to some embodiments, in order to adjust a refractive index, the multiple main patterns may be coated with at least one layer having a high refractive index.

The inclination angle resulting from the refractive index is based on the Snell's law, and the Snell's law is represented by the following Equation 4 with reference to FIG. 3.

$$\frac{\sin\theta_1}{\sin\theta_2} = \frac{n2}{n1} \qquad \text{Equation 4}$$

In Equation 4, $\sin\theta_1$ is a traveling angle or an incidence angle of light shown in a first refractive index n1, and $\sin\theta_2$ is an incidence angle or a traveling angle of light shown in a second refractive index n2.

As previously described, the inclined surface of each of the multiple main patterns in the present embodiment may be provided to have an inclination angle ranging from about 5° to about 85° as an inclination angle which enables an incident beam to be reflected or refracted appropriately.

Also, in the present embodiment, each main pattern 111, in addition to the inclination angle of the inclined surface, a pitch or a rate of a width w to a height h of a bottom surface may be limited to a fixed rate for convenience of a manufacturing process.

For example, when the optical member is implemented so as to emphasize a cubic effect of the three-dimensional effect beam, the width w may be provided to be equal to or smaller than the height h. Also, when the optical member is implemented so as to obtain a relatively long image of the three-dimensional effect beam, the width w may be provided to be larger than the height h.

Also, for example, when each main pattern 111 has a lenticular form, a rate (h/w) of a width to a height of the main pattern 111 of the present embodiment may be about ½ or less, or an inclination angle θ of the inclined surface thereof may be about 60° or less.

As such, in the present embodiment, by using the width w and the height h of each pattern 111 as factors for property adjustment, optical images of the line shaped beam, the three-dimensional effect beam or the like intended to be expressed by the lighting device may be efficiently controlled.

In the present embodiment, among the aforesaid multiple patterns, a width w (which may correspond to a pitch) between two adjacent patterns may be 10 to 500 µm This width (or distance) may refer to an average distance among the multiple main patterns of the first path, and may be selected and adjusted according to a pattern design, an arrangement structure or a desired optical image form.

Also, according to some embodiments, the multiple main patterns may be configured to be concavely inserted into the first surface of the base member or the inside of the base member in the pattern arrangement surface. In this case, each inclined surface of the patterns as the case described above has an inclination angle with respect to the pattern arrangement surface or the z-direction, and when a rate (h/w) of a width to a height of each of the patterns is designed to be about 1 or less, it may be easy to produce the patterns compared to the case in which a rate (h/w) of the width to the height of each of the patterns is 1 or more.

Figure 9:
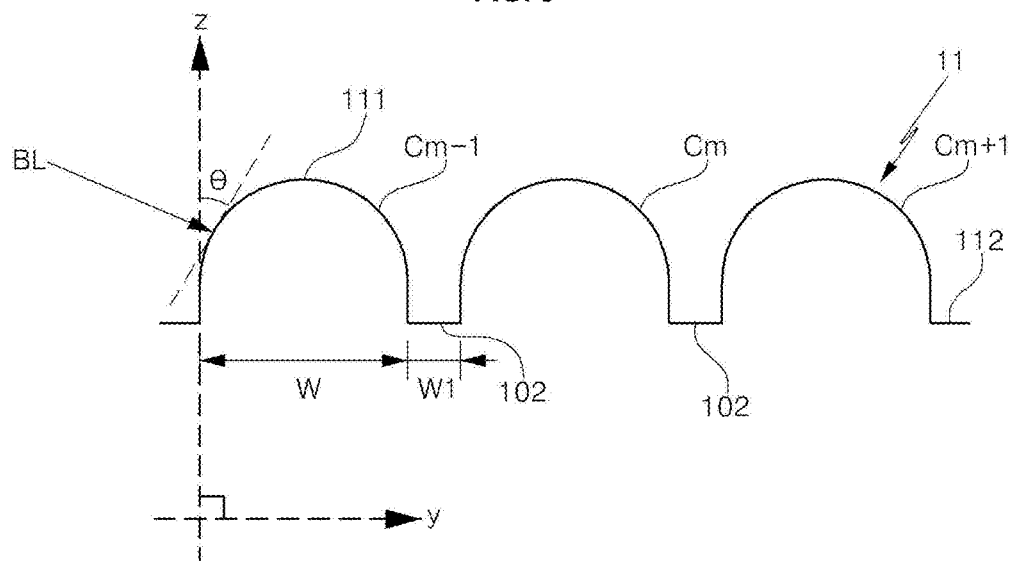
FIG. 9 is a partially enlarged view showing another embodiment of the main patterns of FIG. 8.

FIG. 9 is a partially enlarged view showing another embodiment of the main patterns of FIG. 8.

Referring to FIG. 9, when designing the three-dimensional effect forming portion 11, each of the multiple main patterns 111 may be provided to have a pattern structure of a semicircular or semielliptical section form. Each main pattern 111 has an inclined surface which is inclined at a predetermined angle in a thickness direction (z-direction) of the base substrate or a direction (y-direction) in which the first surface or the pattern arrangement surface 112 extends. Each main pattern 111 may have a symmetrical form based on a central line (not drawn) in a z-direction.

The inclined surface of the main pattern 111 may have a structure in which an inclination angle is changed according to a position on the inclined surface by a semicircular structure of the main patterns. That is, since the inclined surface of each of the main patterns 111 is a surface in contact with an arbitrary point on a circular arc, a tangent line in contact with an arbitrary point on each of the main patterns 111 or a surface in contact with the arbitrary point may be placed at a fixed inclination angle θ in the direction (the z-direction) meeting at right angles to the pattern arrangement surface 112. The inclination angle θ may be larger than 0° and smaller than 90° according to each position of a circular cross section which the beam BL hits.

Also, the three-dimensional effect forming portion 11 of the present embodiment may be configured to further include a separation portion 102 provided between two adjacent main patterns. That is, when the multiple main patterns include a first main pattern Cm−1, a second main pattern Cm, and a third main pattern Cm+1 (wherein m is a natural number of 2 or more), the three-dimensional effect forming portion 11 may include each separation portion 102 between the first main pattern Cm−1 and the second main pattern Cm and between the second main pattern Cm and the third main pattern Cm+1.

The separation portion may be a part of the pattern arrangement surface positioned between two adjacent main patterns as a part of the pattern arrangement surface 112 of the base substrate in which concave main patterns are not formed. Also, the separation portion 102 may be provided for convenience of a manufacturing process as a gap between two adjacent main patterns. The separation portion 102 may be omitted according to the manufacturing process or a pattern design for specific implementation.

A width w1 of the separation portion 102 is smaller than a width w of the main pattern 111. The width w1 of the separation portion 102 may be about ⅕ or less or several µm of the width w of the main pattern 111.

Figure 10:
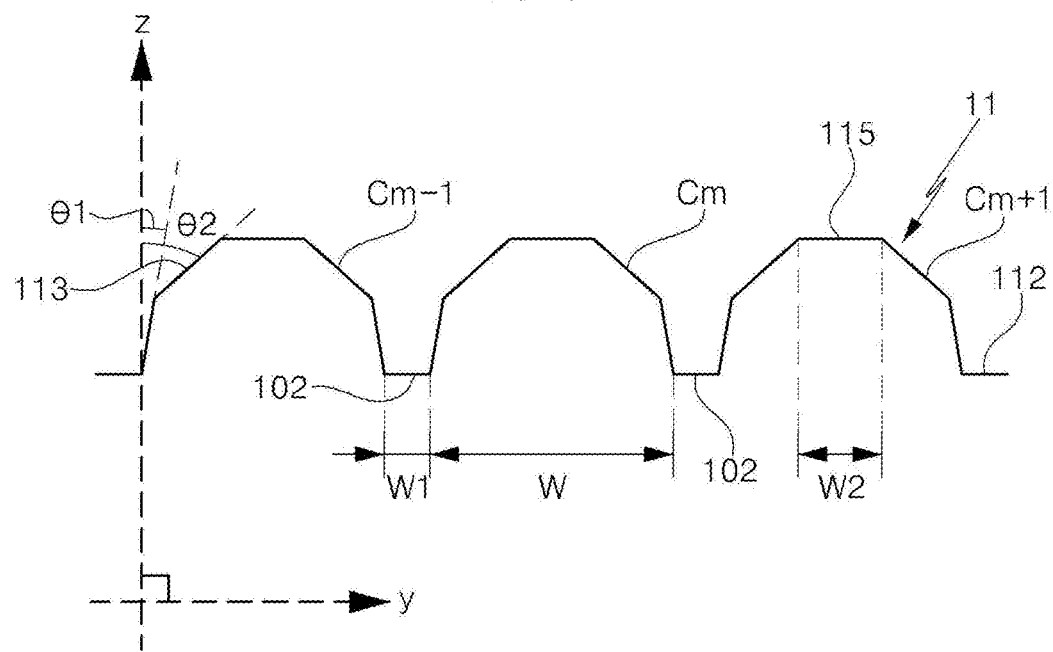
FIG. 10 is a partially enlarged view showing a further embodiment of the main patterns of FIG. 8.

FIG. 10 is a partially enlarged view showing a further embodiment of the main patterns of FIG. 8.

Referring to FIG. 10, when designing the three-dimensional effect forming portion 11 of the optical member of the present embodiment, the multiple main patterns 111 may be provided so as to have a pattern structure of a polygonal cross section form. The inclined surface 113 of each of the main patterns 111 may have a broken line graph form.

In the present embodiment, the inclined surface 113 of each main pattern 111 may be provided to have multiple inclination angles θ1, θ2 according to the number of segments of the curved line graph in the direction (z-direction) which crosses at right angles to the pattern arrangement surface 112. The second inclination angle θ2 may be larger than the first inclination angle θ1. The first and second inclination angles θ1, θ2 may be designed within the range which is larger than about 5° and smaller than about 85° according to a position where the beam BL hits.

Also, the three-dimensional effect forming portion 11 of the present embodiment may be configured to further include the separation portion 102 provided between two adjacent main patterns. That is, when the multiple patterns include the first pattern Cm−1, the second pattern Cm and the third pattern Cm+1, the three-dimensional effect forming portion 11 may have the respective separation portion 102 between the first pattern Cm−1 and the second pattern Cm and between the second pattern Cm and the third pattern Cm+1.

A width w1 of the separation portion 102 is smaller than a width w of the main pattern in order to implement natural line shaped beams or three-dimensional effect beams via the three-dimensional effect forming portion 11. The width w1 of the separation portion 102 is may be about ⅕ or less or several µm or less of the width w of the main pattern. When a line shaped beam or a three-dimensional effect beam having a desired shape (a shape without an interruption or the like) is implemented through a design of the multiple main patterns, the width w1 of the separation portion 102 may be designed to be narrow maximally or may be designed so that the separation portion 102 can be omitted. When the separation portion 102 is provided, the pattern separation portion 102 is designed to have the width w1 of several µm or less.

Also, the three-dimensional effect forming portion 11 of the present embodiment may have an interrupted surface 115 parallel to the first surface or the pattern arrangement surface 113 of the respective main patterns. The interrupted surface 115 is a part which does not function to enable light to be substantially emitted to the outside through the reflection or refraction of incident beam. Thus, since a line-shaped beam implemented by the multiple main patterns may have an interrupted part corresponding to the interrupted surface 115, a width w2 of the interrupted surface 115 may be appropriately designed in a range of below several µm in order to implement a line-shaped beam having a desired shape.

Figure 11:
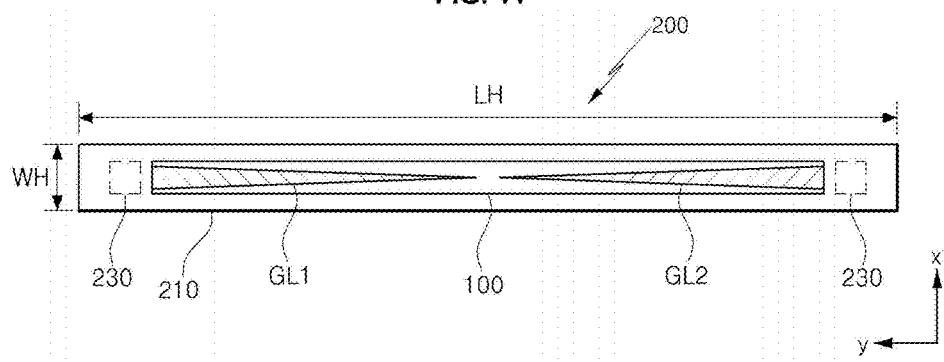
FIG. 11 is a plan view showing a part of a lighting device according to an embodiment of the present disclosure.

FIG. 11 is a plan view showing a part of a lighting device according to an embodiment of the present disclosure. For convenience of the description, the lighting device of FIG. 11 has a structure in which the multiple effect forming portion is omitted.

Referring to FIG. 11, a lighting device 200 according to the present embodiment is configured to include an optical member 100 and a light source portion 230. The lighting device 200 has a predetermined length LH and width WH on the plane. The length LH and the width WH may be provided to be similar or identical to a length and a diameter of a 20 W fluorescent lamp or a 40 W fluorescent lamp.

The optical member 100 may be any one of the optical members according to the embodiments previously described with reference to FIGS. 1 to 10. That is, the optical member 100 includes the base substrate and the three-dimensional effect forming portion provided on the first surface of the base substrate. The three-dimensional effect forming portion includes multiple main patterns that extend in the x-direction on the first and are sequentially arranged in the y-direction. Thanks to this configuration, the optical member 100 may display the incident beam from each of two light source portions 30 as line-shaped beams GL1, GL2.

In the present embodiment, two line-shaped beams GL1, GL2 are displayed in areas different from each other of the single three-dimensional effect forming portion, and are displayed as three-dimensional effect beams that extend in directions facing each other toward the center portion at both ends of the length direction of the single three-dimensional effect forming portion and disappear at the center portion.

Of course, when the optical member 100 is configured to include the multiple effect forming portion provided on the second surface of the base substrate, the optical member 100 may be operated such that the line-shaped beams GL1, GL2 are expressed in a state of being divided into two line-shaped beams in a width direction of the optical member.

The light source portion 230 may be disposed to be attached to one surface of the support member 210 in a plate form or to be separated from the one surface of the support member 210 by a predetermined distance. The light source portion 230 may be configured to include a first light source and a second light disposed at both ends in a length direction of the support member 210, respectively, so as to irradiate a beam having a light effective area of a hemispherical area toward a center portion of the support member 20.

The first light source and the second light source are disposed to irradiate light in the directions facing each other. The first light source and the second light source may be disposed to irradiate light toward different directions while having an angle exceeding 90° but not exceeding 180° therebetween (see reference numeral 230 of FIG. 17).

In the present embodiment, the light source portion 230 may be provided with any one of various existing light sources such as an incandescent lamp, a halogen lamp, a discharge lamp and the like or may be provided as indirect light sources such as a guide member and the like for guiding or reflecting natural light resulting from the sun. Also, according to some embodiments, the light source portion 230 may be provided to include LED (Light Emitting Diode) elements. In this case, the light source portion 230 may include a printed circuit board in which an LED light source and a drive circuit supplying power to the light source are installed.

The support member 210 may be at least a part of a housing of the lighting device 200, a wall inside and outside a building or one surface of a product or equipment. The support member 210 may be implemented using devices or products without being specially limited thereto if the devices or products enable an optical member 100 to be disposed at a place where light of the light source portion 230 is irradiated. For example, the support member 210 may be implemented using a cap, clothing shoes, a bag, an accessory, indoor or outdoor interior components and the like.

According to the present embodiment, the light irradiated from two light sources to a central part of the support member 210 may be implemented as lighting of a line shaped beam in which the light starts from both ends of the support member 210 by the refraction and reflection operation of the multiple main patterns and disappears at the central part of the support member 210. Also, some embodiments, when the multiple effect forming portion disposed to overlap with the three-dimensional effect forming portion is used, a single line shaped beam with a three-dimensional effect may be converted in and displayed as multiple line shaped beams with a three dimensional effect.

Figure 12:
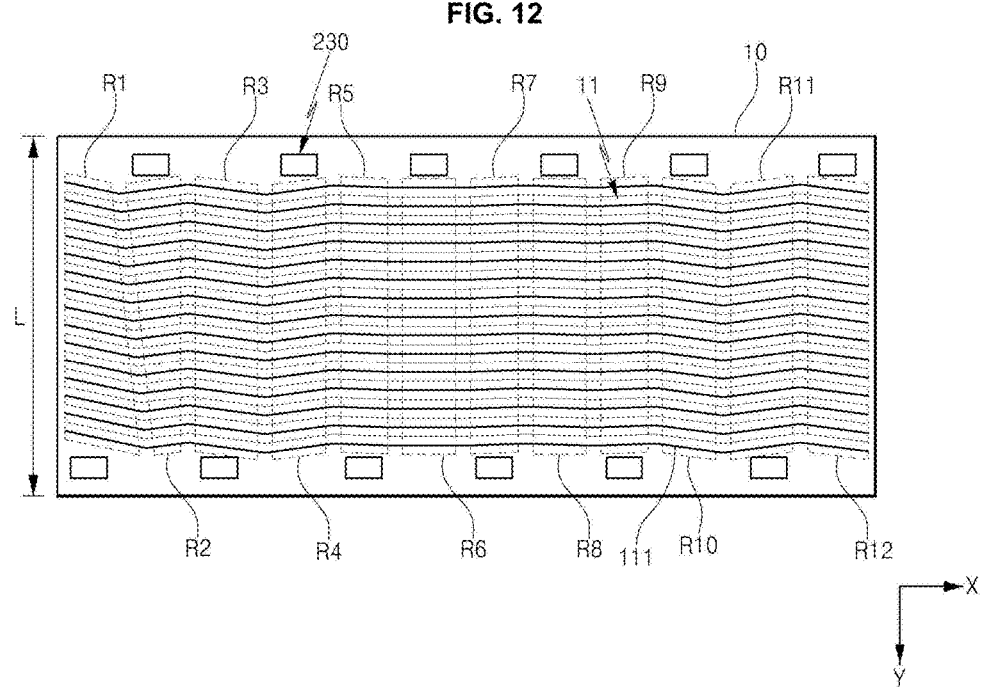
FIG. 12 is a plan view showing a part of a lighting device according to another embodiment of the present disclosure.
Figure 13:
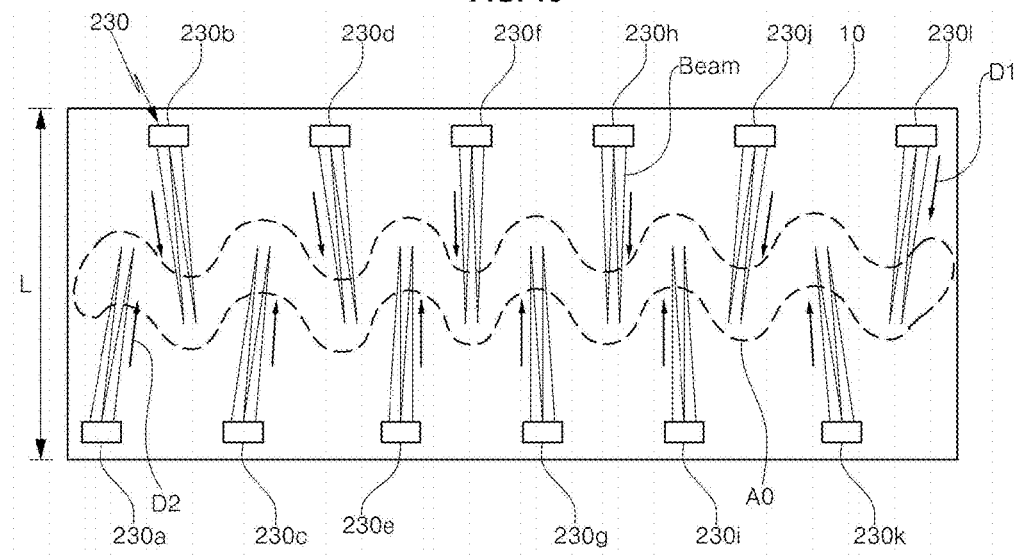
FIG. 13 is a view schematically showing an operational status of the lighting device of FIG. 12.

FIG. 12 is a plan view showing a part of a lighting device according to another embodiment of the present disclosure. FIG. 13 is a view schematically showing an operational status of the lighting device of FIG. 12.

Figure 17:
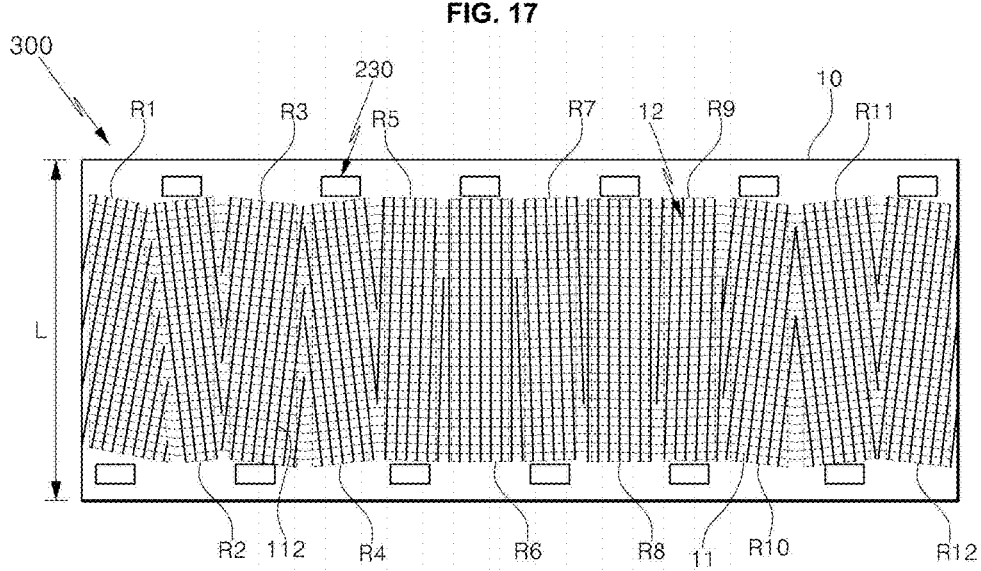
FIG. 17 is a plan view of the lighting device of FIG. 16.

For convenience of the description, the lighting device of FIG. 12 may correspond to a structure in which the multiple effect forming portion is removed from the lighting device of FIG. 17.

Referring to FIGS. 12 and 13, the lighting device according to the present embodiment is configured to include: a base substrate 10; a three-dimensional effect forming portion 11; and a light source portion 230. An optical member is configured to include: the base substrate 10; and the three-dimensional effect forming portion 11.

The optical member of the present embodiment may be substantially identical to the optical member previously described with reference to FIGS. 1 to 3 except for the fact that the three-dimensional effect forming portion 11 has multiple main patterns of multiple groups that are sequentially arranged in different directions in multiple areas R1 to R12 different from each other of the base substrate 10.

That is, the three-dimensional effect forming portion 11 is configured to include 12 sub-three-dimensional effect forming portions arranged in areas R1, R2, R3, R4, R5, R6, R7, R8, R9, R10, R11 and R12 different from each other of the base substrate 10, respectively. Each of the multiple sub-three-dimensional effect forming portions may have a first sub-main pattern to an nth sub-main pattern. Here, n is a natural number of 2 or more.

The multiple sub-three-dimensional effect forming portions may be configured to include a first sub-three-dimensional effect forming portion and a second sub-three-dimensional effect forming portion. For example, the multiple sub-main patterns of the first sub-three-dimensional effect forming portion and the multiple main patterns of the second sub-three-dimensional effect forming portion are arranged in different directions. In this case, each of the sub-main patterns of the multiple sub-three-dimensional effect forming portions may be provided to sequentially extend to the different areas in such a manner that respective pattern lines of the sub-main patterns from the first sub-three-dimensional forming portion of one side to the twelfth sub-three-dimensional forming portion of another side are connected to each other at a boundary part of two adjacent sub-three-dimensional effect forming portions. At this time, the respective sub-main patterns may have a bent portion at the aforesaid boundary part.

The light source portion 230 is configured to include 12 light sources 230a to 230l irradiating a beam to the areas R1, R2, R3, R4, R5, R6, R7, R8, R9, R10, R11 different from each other of the base substrate 10. The respective light sources may be LED light sources. In the present embodiment, the LED light source may be an LED package including two LED elements and may be provided so that two beams can be emitted by the respective LED elements. The beams from the respective light sources are controlled as line-shaped beams by the main patterns 111 (corresponding to the sub-main patterns) of the respective areas. Here, an optical width of the line-shaped beam may be below a width of a light emitting surface of the corresponding light source irradiating the beams to the main patterns, and a length of the line-shaped beam may be larger than the optical width.

When the sub-main patterns of the multiple groups described above are used, line shaped beams D1 and the like extending in the same direction or line shaped beams D1 and the like extending from the same direction to directions crossing each other may be implemented by controlling the incident beams from the light sources irradiating beams in roughly a hemispherical shape based on the light sources in each areas. Also, according to some embodiments, line shaped beams D1, D2 extending in opposite directions or line shaped beams extending a direction having an angle of more than 90° and less than 180° from the opposite directions, namely directions crossing each other, may be implemented.

According to the present embodiment, by using the three-dimensional effect forming portion 11 provided on the base substrate 10 having a length L of the width direction of about 250 mm, the light of a white LED lamp of about 10 W may be implemented as a three-dimensional effect beam or a line shaped beam with a three-dimensional effect in which the intensity of light of the light source becomes largely weak or disappears at roughly the central part A0 in the width direction of the base substrate 10.

Figure 14:
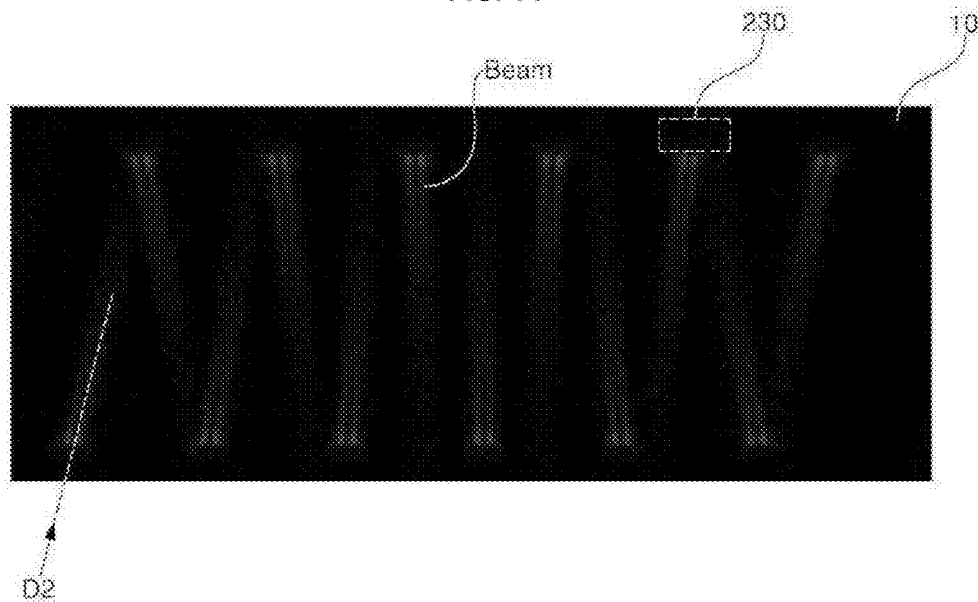
FIG. 14 is a view regarding the operational status of the lighting device of FIG. 12.

FIG. 14 is a view regarding the operational status of the lighting device of FIG. 12.

Referring to FIG. 14, when the lighting device according to the present embodiment is operated, light of each of the light sources is irradiated from the edges of both sides in a width direction of the base substrate 10 toward a central part (see A0 of FIG. 13), and is displayed as a three-dimensional effect beam traveling to the first path (D2 and the like) in a predetermined optical width through the main patterns of each area of the base substrate 10.

In each area of the base substrate 10 in which the three-dimensional effect forming portion is provided, the three-dimensional effect beams may be implemented to have a specific first path (D2 and the like) and an optical width according to each pattern design of the main patterns.

According to the present embodiment, the beam passing along the base substrate 10 may be expressed by the sequentially arranged patterns on the base substrate 10 as a three-dimensional effect beam in which the intensity of light reduces rapidly and disappears at a very relatively short distance (for example, about 100 to 200 mm). Here, the very short distance corresponds to a short distance beyond '1/ (hundreds to thousands of' times compared to a distance (for example, several meters to tens of meters) in which light passing along a transparent substrate is naturally reduced and disappears when the light is irradiated to the transparent substrate (corresponding to the base substrate) of a comparative example in which main patterns are not provided.

Meanwhile, in the present embodiment, it is illustrated that each of the light sources of the lighting device irradiates two beams by using the LED package having two LED elements as the light sources, but the present disclosure is not limited to such a configuration. Each of the light sources may irradiate one beam by using the LED package having one LED element as the light sources.

Figure 15:
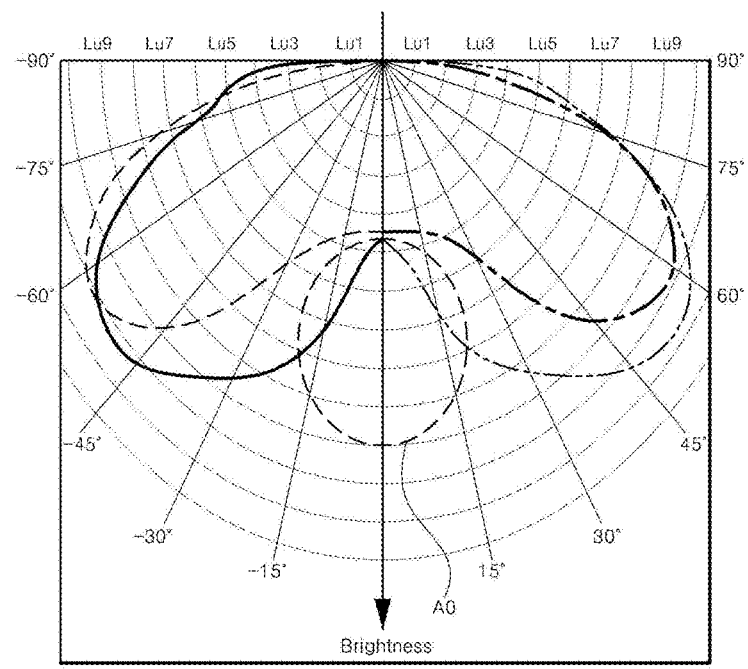
FIG. 15 is a graph in which brightness of the lighting device of FIG. 12 is measured.

FIG. 15 is a graph in which brightness of the lighting device of FIG. 12 is measured. The graph of the present embodiment shows the brightness measured by disposing a brightness measuring device in a front center portion of the lighting device of FIG. 12.

Referring to FIG. 15, when the intensity of light of the light source is maximally Lu12, it can be seen that a first brightness (about Lu5) shown in an intermediate area A0 of the front of the light emitting surface of the lighting device is relatively largely small compared to a second brightness (about Lu7 to about Lu12) shown in the other areas of the front of the light emitting surface. In particular, when considering the fact that the first brightness of the intermediate area A0 is influenced by the second brightness of the other areas of the periphery, it can be predicted that the intensity of light of the light emitting surface corresponding to the intermediate area A0 in the lighting device is really close to 0.

The reason why the measurement results of the graph are shown is because the beams passing along the base substrate are sequentially refracted and reflected from the main patterns of the three-dimensional effect forming portion in a the first direction. When this principle is used, optical images (line shaped beams, the three-dimensional effect beam and the like) having desired shapes may be implemented through a pattern design.

Figure 16:
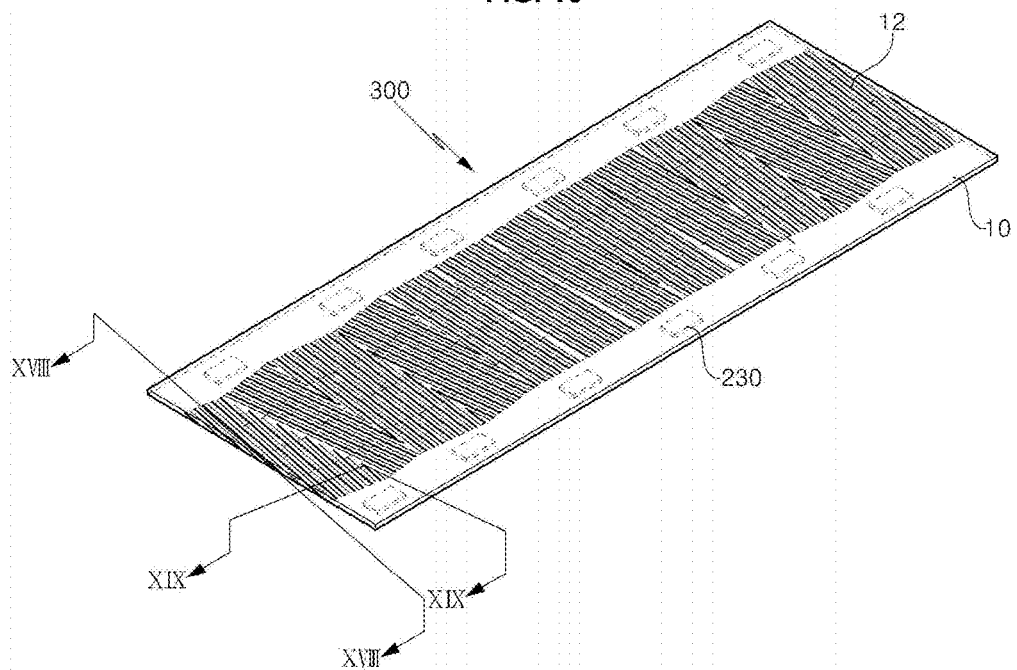
FIG. 16 is a perspective view of a lighting device according to a further embodiment of the present disclosure.

FIG. 16 is a perspective view of a lighting device according to a further embodiment of the present disclosure. FIG. 17 is a plan view of the lighting device of FIG. 16.

Referring to FIGS. 16 17, a lighting device 300 according to the present embodiment is configured to include: the base substrate 10; the three-dimensional effect forming portion 11; the multiple effect forming portion 12; and the light source portion 230.

The lighting device 300 of the present embodiment may be substantially identical to the lighting device of FIG. 12 except for the fact that the multiple effect forming portion 12 is disposed on one surface (the second surface) of the base substrate 10. Accordingly, when explaining the constitutive elements of the lighting device 300 of the present embodiment, the detailed description on the constitutive elements similar or identical to those of the lighting device of FIG. 12 is omitted in order to avoid overlapping.

The multiple effect forming portion 12 is configured to include optical patterns (see reference numeral 121 of FIG. 1). In the present embodiment, the multiple effect forming portion 12 includes sub-optical patterns of multiple groups arranged in a lamination structure with respective sub-main patterns of the three-dimensional effect forming portion 11 disposed in areas R1, R2, R3, R4, R5, R6, R7, R8, R9, R10, R11 and R12 different from each other. The multiple effect forming portion 12 may include 12 sub-multiple effect forming portions disposed in the areas different from each other of the base substrate 10, respectively. Each of the sub-multiple effect forming portion may have the first optical pattern to an nth optical pattern. Here, n is a natural number of 2 or more.

The multiple sub-multiple effect forming portions may be configured to include a first sub-multiple effect forming portion and a second sub-multiple effect forming portion. In this case, the multiple optical patterns of the first sub-multiple effect forming portion and the multiple optical patterns of the second sub-multiple effect forming portion may be arranged in different directions. Also, when viewed on a predetermined plane by projecting the optical patterns, an arrangement direction of the optical patterns of the respective sub-multiple effect forming portions may be provided to extend in a direction that crosses an arrangement direction of the main patterns of the respective three-dimensional effect forming portions corresponding thereto or meets at right angles to the arrangement direction of the main patterns.

According to the present embodiment, by converting a single three-dimensional effect beam (or a single line-shaped beam) having perceptional depth in a thickness direction of the base substrate 10 and reflected from the uneven patterns of the three-dimensional effect forming portion 11 using the lamination structure of the three-dimensional effect forming portion 11 and the multiple effect forming portion 12 provided on both surfaces, respectively, having a predetermined width, direction and length L, a first three-dimensional effect beam traveling to the right of the single three-dimensional effect beam and a second three-dimensional effect beam traveling to the left of the single three-dimensional effect beam may be expressed.

Figure 18:
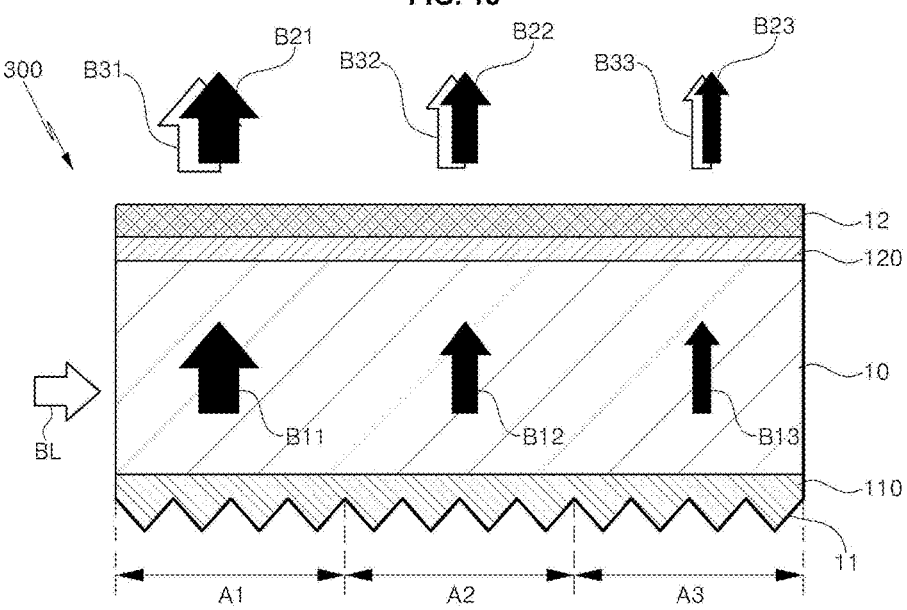
FIG. 18 is a cross-sectional view for explaining the principles of generating of a single line-shaped beam or three-dimensional effect beam.

FIG. 18 is a cross-sectional view for explaining the principles of generating of a single line-shaped beam or three-dimensional effect beam. FIG. 18 may correspond to a partially enlarged cross-sectional view of a cross section of the lighting device of FIG. 16 taken along line XVIII-XVIII.

Referring to FIG. 18, the lighting device 300 according to the present embodiment is configured to include: the base substrate 10; the three-dimensional effect forming portion 11 provided on the first surface of the base substrate 10; and the multiple effect forming portion (12) provided on the second surface of the base substrate 10. The three-dimensional effect forming portion 11 includes multiple main patterns (see reference numeral 111 of FIG. 1), and the multiple effect forming portion 12 includes multiple optical patterns (see reference numeral 121 of FIG. 1).

The three-dimensional effect forming portion 11 of the present embodiment is provided by bonding a separate uneven pattern substrate 110 to the first surface of the base substrate 10, but is not limited thereto. Like the optical member 100 of FIG. 1, the three-dimensional effect forming portion may be provided in a form in which a part of the first surface of the base substrate 10 is removed. Also, the multiple effect forming portion 12 is provided by bonding a separate optical pattern substrate 120 to the second surface of the base substrate 10, but is not limited thereto. Like the optical member 100 of FIG. 1, the multiple effect forming portion may be provided in a form in which a part of the second surface of the base substrate 10 is removed.

According to the lighting device 300 of the present embodiment, when the three-dimensional effect forming portion (11)(corresponding to the sub-three-dimensional effect forming portion) of each area (see R1 to R12 of FIG. 17) of the base substrate 10 is divided into a first area A1, a second area A2 and a third area A3 according to a distance from the light source (see LS of FIG. 3) placed at a predetermined position resulting from going back to the direction in which the light BL is irradiated, the light induced into an arrangement direction of the main patterns 111 while passing along the three-dimensional effect forming portion 11 is refracted and reflected in a thickness direction of the base substrate 10 by the main patterns.

In this case, since the main patterns of the first area A1 are positioned at the nearest distance from the light sources, the main patterns have refraction and reflection efficiency of the highest level, and serve as indirect light sources of a first luminous intensity; since the main patterns of the second area A2 are positioned after the main patterns of the first area A1 in a traveling direction of the light BL, the main patterns have refraction and reflection efficiency of a middle level smaller than the level of the main patterns of the first area A1 and serve as indirect light sources of a second luminous intensity smaller than that of the first luminous intensity; and since the main patterns of the third area A3 reflect and refract the light passing along the main patterns of the first area A1 and the second area A2, the main patterns have refraction and reflection efficiency of a level smaller than the level of the main patterns of the second area and serve as indirect light sources of a third luminous intensity smaller than that of the second luminous intensity.

According to the aforesaid three-dimensional effect forming portion 11, as viewed from a specific standard point or an observing point, the main patterns positioned farther away from the light sources in main moving directions of light or in the first path may serve as indirect light sources for emitting the light of the light sources positioned farther away from the main patterns. That is, the main patterns serve as indirection light sources have a perceptional depth or a sense of distance in a form in which the light enters the base substrate 10 in the thickness direction of the base substrate 10 of the first path, thereby expressing three-dimensional effect beams having luminous intensity B11, B12, B13 showing a sequential reduction in the intensity of light.

Also, according to the lighting device 300 of the present embodiment, the light from the main patterns of the three-dimensional effect forming portion 11 toward the multiple effect forming portion 12 is divided into two beams in the thickness direction of the base substrate 10 through the optical patterns of the multiple effect forming portion 12. The optical patterns may correspond to sub-optical patterns. That is, the multiple effect forming portion 12 may convert a single three-dimensional effect beam B11, B12, B13 of the three-dimensional effect forming portion 11 into a first three-dimensional effect beam B21, B22, B23 and a second three-dimensional effect beam B31, B32, B33.

According to the present embodiment, the lighting device 300 may express the single three-dimensional effect beam as the first three-dimensional effect beam and the second three-dimensional effect beam having perceptional depths which become higher in order according to an increase in the distance from the light sources.

Figure 19:
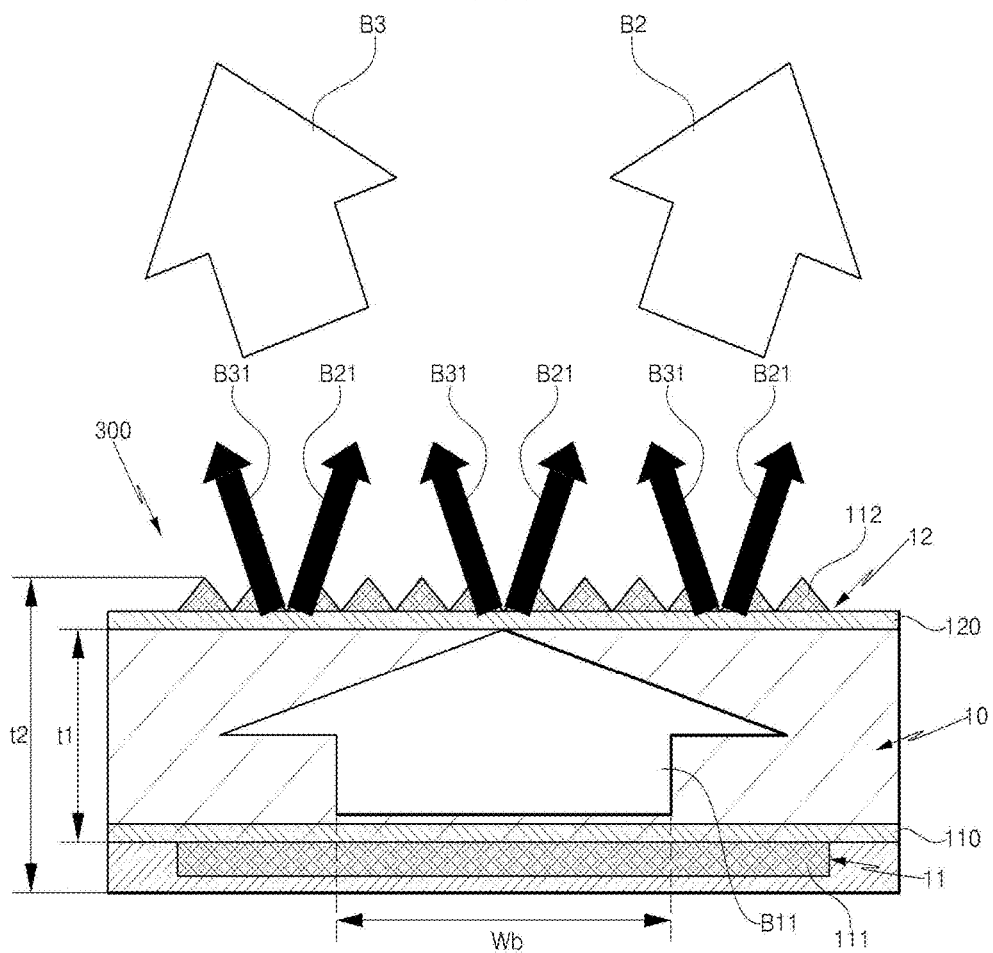
FIG. 19 is a cross-sectional view for explaining the principles of generation of multiple line-shaped beams or three-dimensional effect beams in each area of the lighting device of FIG. 16.

FIG. 19 is a cross-sectional view for explaining the principles of generation of multiple line-shaped beams or three-dimensional effect beams in each area of the lighting device of FIG. 16.

FIG. 19 may correspond to a schematically enlarged cross-sectional view of a cross section of the lighting device of FIG. 16 taken along line XIX-XIX. Also, the lighting device of FIG. 19 may be configured to include substantially the same constitutive elements as those of the lighting device of FIG. 18 except for the fact that a position of the cross section is different therefrom.

Referring to FIG. 19, in a lighting device 300 according to the present embodiment, a three-dimensional effect beam B11 refracted and reflected from the main patterns 111 of the three-dimensional effect forming portion 11 and traveling to the multiple effect forming portion 12 is converted into multiple three-dimensional effect beams B2, B3 by the optical patterns 112 of the multiple effect forming portion 12.

That is, the first incident beam B11 traveling in a first direction may be converted into first emitting beams B21, B2 traveling in a second direction at the right of the first incident beam B11 from the optical pattern 112 of the multiple effect forming portion 12 and second emitting beams B31, B3 traveling in a third direction at the left of the first incident beam B11.

According to the present embodiment, a thickness of the optical member (or the lighting device) provided in a lamination structure of the uneven pattern substrate 110 including the base substrate 10, and the three-dimensional effect forming portion 11 and the optical pattern substrate 120 including the multiple effect forming portion 12 may range from about 25 to 250 μm in the case of a sheet or film structure which enables roll winding, and may be larger than 250 μm and about 500 μm or less in the case of a plate structure which does not enable roll winding.

When the thickness t2 of the optical member is thinner than 25 μm it will be difficult to express perceptional depth of the three-dimensional effect beam. Also, when the thickness t2 of the optical member is thicker than 500 μm as the optical member used in the lighting device of a plate form, a weight thereof may be increased, and costs incurred for producing the optical member to be transparent may be increased.

A thickness of each main pattern 111 of the three-dimensional effect forming portion 11 may be about several μm or more and about tens of μm or less. When the thickness of each main pattern 111 is smaller than several μm it will be difficult to process the main patterns, and when the thickness thereof exceeds tens of μm each main pattern itself is increased in size so that the degree of freedom in design can be limited and a bad influence can be exerted on the implementation of a three-dimensional effect beam.

Also, a thickness of each optical pattern 121 of the multiple effect forming portion 12 may be similar or identical to that of each main pattern 111. The thickness of each main pattern 111 and the thickness of each optical pattern 121 may be calculated in a thickness resulting from subtracting a thickness t1 of the base substrate from a thickness t2 of the optical member.

In the present embodiment, when the thickness t1 of the base substrate 10 is smaller than a height of the light emitting surface of the light source portion corresponding to this thickness, the base substrate 10 fails to serve as a light guide member for guiding light through total internal reflection.

Figure 20:
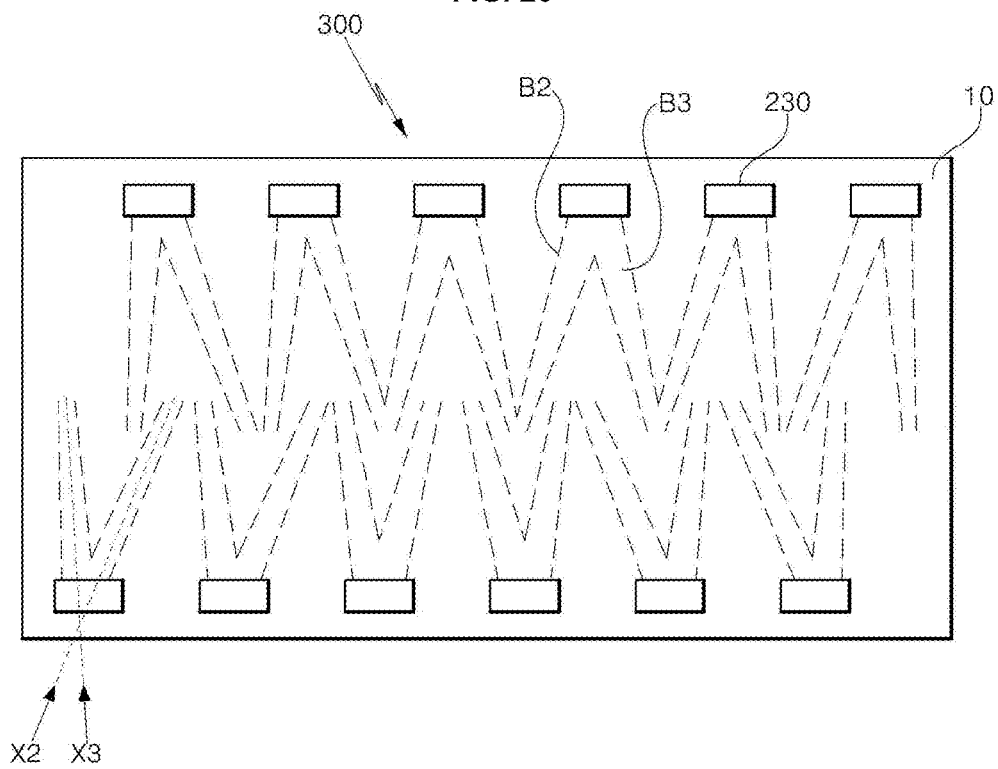
FIG. 20 is a plan view regarding an operational status of the lighting device of FIG. 16.
Figure 21:
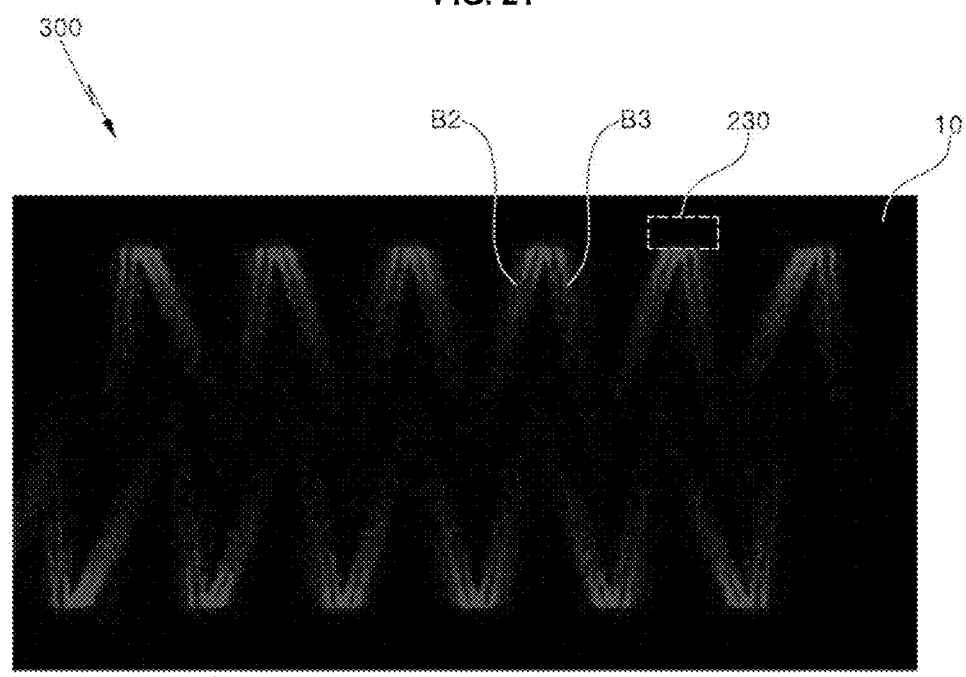
FIG. 21 is a view regarding an operational status of the lighting device of FIG. 16.

FIG. 20 is a plan view schematically showing an operational status of the lighting device of FIG. 16. FIG. 21 is a view regarding an operational status of the lighting device of FIG. 16.

Referring to FIGS. 20 and 21, in the lighting device 300 according to the present embodiment, an incident beam from the light source 230 is primarily converted into a single three-dimensional effect beam (see B11, B12, B13 of FIG. 18) by the three-dimensional effect forming portion and the multiple effect forming portion which are disposed to be laminated, and the converted single three-dimensional effect beam is secondarily converted into multiple three-dimensional effect beams B2, B3.

In the present embodiment, the multiple three-dimensional effect beams B2, B3 are expressed in a form in which the beams travel in two specific directions X2, X3. At this time, when the multiple effect forming portion is removed, the lighting device 300 expresses a single three-dimensional effect beam traveling in roughly a intermediate direction (see D2 of FIGS. 13 and 14) of two directions X2, X3.

According to the present embodiment, the single three-dimensional effect beam may be expressed as the multiple three-dimensional effect beams using the three-dimensional effect forming portion and the multiple effect forming portion. That is, according to the present embodiment, the lighting device having a high degree of freedom in design and capable of providing an aesthetic impression to the user can be efficiently designed and produced. Also, as various colors of the LED light sources are used, the lighting device capable of producing an atmosphere suitable for an illumination installation place, a learning environment or a working environment may be implemented.

Figure 22:
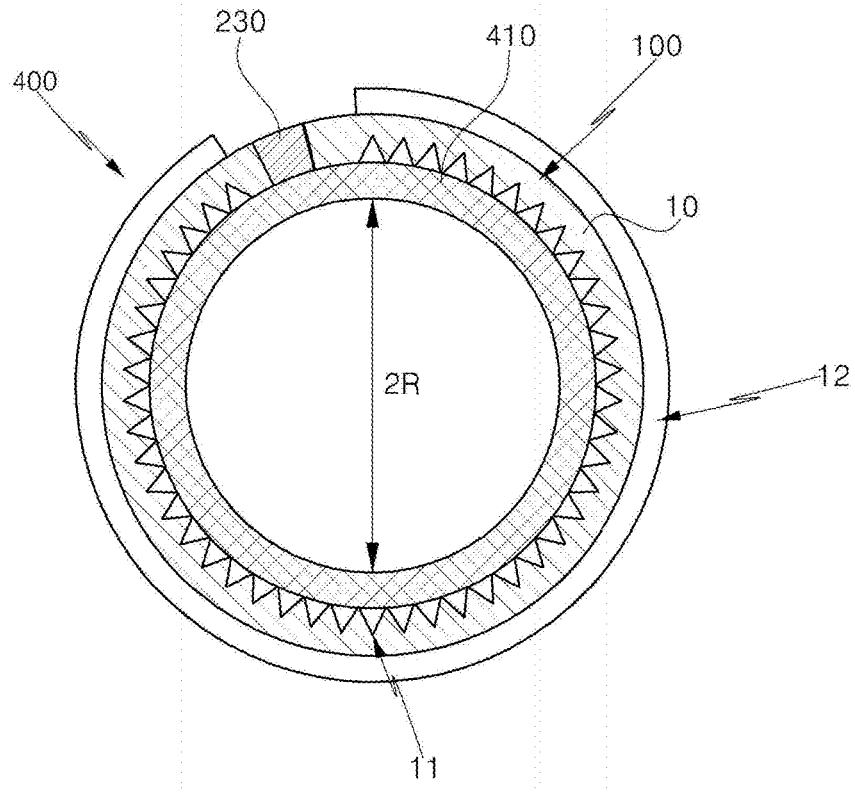
FIG. 22 is a cross-sectional view of a lighting device of yet another embodiment of the present disclosure.

FIG. 22 is a cross-sectional view of a lighting device of yet another embodiment of the present disclosure.

Referring to FIG. 22, a lighting device 400 according to the present embodiment is configured to include: the base substrate 10; the three-dimensional effect forming portion 11; the multiple effect forming portion 12; the light source portion 230; and a support member 410. The optical member 100 is configured to include: the base substrate 10; the three-dimensional effect forming portion 11 and the multiple effect forming portion 12.

In the present embodiment, the optical member 100 may be provided using any one of the optical members according to the embodiments previously described with reference to FIGS. 1 to 10. In the present embodiment, the optical member 100 is provided in a film form. A thickness of the optical member 100 is about 25 to 250 μm or less. When the thickness of the optical member 100 is smaller than 25 μm it may be difficult to produce the optical member and durability may be largely reduced. Also, when the thickness of the optical member 100 is larger than 250 μm flexibility is reduced, so that it may be difficult to install the optical member at the support member 410 having a predetermined curvature.

The light source portion 230 is disposed so as to irradiate light to one side of the optical member 100. The light source portion 230 may be provided as an LED package or an LED string including one or two or more LED elements. When the light source portion includes multiple LED elements, the single line-shaped beam (or the single three-dimensional effect beam) including multiple beams may be expressed as multiple line-shaped beams (or multiple three-dimensional effect beams) by the optical member 100.

The support member 410 may be a housing having a curvature, a wall inside or outside a building having a bent portion, or one surface of a product. In the present embodiment, the support member 410 has a hollow type cylindrical shape having a predetermined diameter 2R.

If any device or product enables the optical member 100 of a sheet phase to be disposed at a place where light of the light source portion 230 is irradiated to one side, the support member 410 may be implemented by the device and product without being specially limited. Furthermore, the support member 410 may be implemented using a circular or hollow cap, clothing, shoes, a bag, an accessory, indoor and outdoor interior components and the like.

According to the present embodiment, the optical member is attached to an application product, a product or a building having a curvature so that illumination of various optical designs can be implemented through the line shaped beams or the line shaped beams with the three-dimensional effect.

Figure 23:
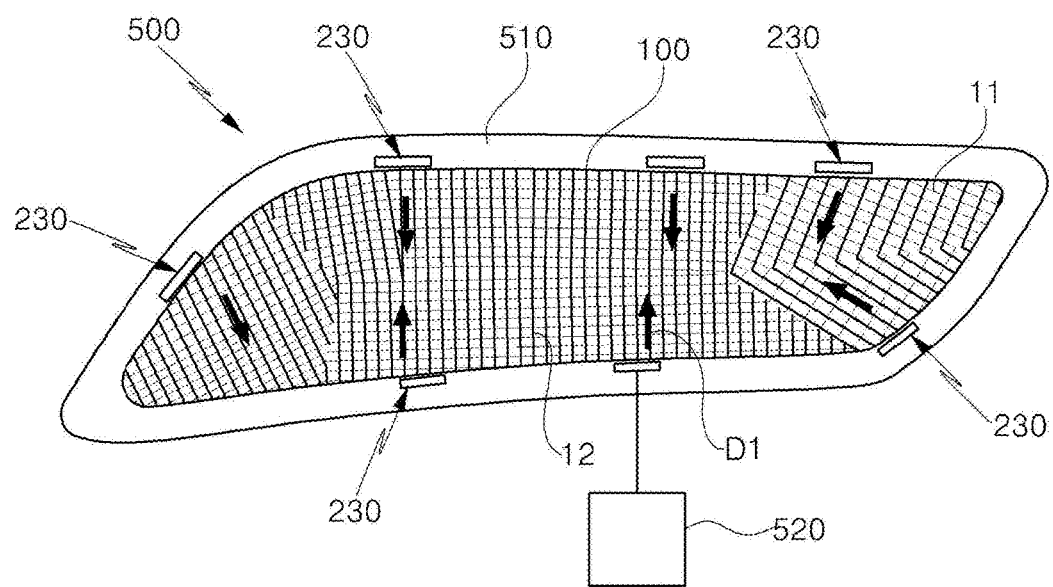
FIG. 23 is a plan view of a lighting device of still another embodiment of the present disclosure.

FIG. 23 is a plan view of a lighting device of still another embodiment of the present disclosure.

Referring to FIG. 23, a lighting device 500 according to the present embodiment is configured to a base substrate 10; the three-dimensional effect forming portion 11 and the multiple effect forming portion 12 provided on both surfaces of the base substrate 10; the light source portion 230; and an outer lens 510. When the lighting device 500 is used for car illumination, the light source portion 230 may be operated by power supplied from a car battery 520.

The optical member 100 is configured to include: the base substrate 10; the three-dimensional effect forming portion 11; and the multiple effect forming portion 12. The optical member 100 is configured to include a plurality of sub-threedimensional effect forming portions and a plurality of multiple effect forming portions which are arranged in individual directions, respectively in different areas of the base substrate 10. Also, the optical member 100 may be bonded to one surface (an inner side) of the outer lens 30 having a curvature or may be separated by a predetermined distance.

In the present embodiment, the optical member 100 may be provided using any one of the optical members of the embodiments previously described with reference to FIGS. 1 to 10. Also, the optical member 100 may be may be provided using any one of the optical members of the embodiments previously described with reference to FIGS. 12 to 22.

The light source portion 230 is provided so as to irradiate light to different areas of the optical member. The light source portion 230 includes multiple light sources, and each of the light sources may be an LED package including one or two or more LED elements.

The outer lens 510 includes to a lens-shaped cover disposed on an outer surface of the lighting device such as a light device for a vehicle (a headlight, a rear light and the like), an outdoor lighting device and the like. When the outer lens is used in vehicles, the outer lens 510 may be provided on one surface, in which the optical member 100 is disposed, so as to have a curvature leading to a curved surface of a vehicle body. The outer lens 510 may be made of a transparent plastic material, for example, engineering plastic and the like. The lighting device for vehicles may include a headlight, a rear light, car indoor illumination, a fog lamp, a door scarf or the like. In this case, in terms of a volume, a thickness, a weight, a price, a life span, stability, a degree of freedom in design, and easiness of installation, the lighting device 500 of the present embodiment may be usefully applied compared to the existing lamps for vehicles.

Meanwhile, the lighting device 500 of the present embodiment is not limited to a lighting device for vehicles, and may be applied to a curve portion or a bent portion inside or outside an object for illustration installation, such as a building, equipment, furniture and the like, as a flexible lighting device in a film form. In this case, the outer lens 510 may be a transparent support member or a housing for supporting the optical member 100 or the light source portion 230.

According to the present embodiment, by guiding the light of the respective light sources into the first path (D1 and the like) through a combination of the three-dimensional effect forming portion and the multiple effect forming portion provided in different areas, respectively of the optical member, a single three-dimensional effect beam limited to a predetermined optical width and having a perceptional depth in the thickness direction of the optical member may be displayed as multiple three-dimensional effect beams twice as many number as the light sources.

Also, the present embodiment may provide the lighting device capable of expressing multiple three-dimensional effect beams traveling along the extension directions of the main patterns according to movement of an observing point of a user or an observation instrument.

FIG. 24 is a partially cross-sectional view of an optical member according to a further embodiment of the present disclosure.

Referring to FIG. 24, an optical member 100B according to the present is configured to include a base substrate 10; an uneven pattern substrate 110 having a three-dimensional effect forming portion 11; an optical pattern substrate 120 having a multiple effect forming portion 12; a first adhesive layer 140 for bonding the uneven pattern substrate 110 to a first surface of the base substrate 10; and a second adhesive layer 150 for bonding the optical pattern substrate 120 to a second surface of the base substrate.

According to the present embodiment, the optical member 100B may be similar to or substantially identical to the optical members of the lighting devices previously described with reference to FIGS. 11 to 23 except for the first adhesive layer 140 and the second adhesive layer 150. That is, the base substrate 10, the three-dimensional effect forming portion 11 and the multiple effect forming portion 12 of the optical member 100B are similar to or substantially identical to those of the optical members of the respective lighting devices according to the embodiments described above, and accordingly, the detailed description thereof is omitted.

The uneven pattern substrate 110 and the optical pattern substrate 120 may be made of a thermoplastic resin or a photocurable resin. A material of each of the uneven pattern substrate 110 and the optical pattern substrate 120 may be polycarbonate, polymethylmethacrylate, polystyrene or polyethylene terephthalate.

The first adhesive layer 140 may be formed with an epoxy adhesive film, and the like. Also, in order to adjust a refractive index, the first adhesive layer 140 may be implemented using PEA ((Phenoxyethyl Acrylate) which is a high refractive material. Also, the first adhesive layer 140 may be implemented with a fluorinate polymer, a fluorinate monomer and the like. The second adhesive layer 150 may be made of an adhesive material which is identical to or different from that of the first adhesive layer 140.

According to a thickness of the first adhesive layer 140 or the second adhesive layer 150, the base substrate 10 and the optical pattern substrate 120 may be separated from each other. In this case, it is preferable that a spaced distance therebetween be below several mm in order to efficiently implement a line-shaped beam or a three-dimensional effect beam.

Meanwhile, when the first adhesive layer 140 is prepared, a refractive index of each of the base substrate 10 and the uneven pattern substrate 110 may be considered. That is, a refractive index of the first adhesive layer 140 may be larger than each of the refractive index of the base substrate 10 and the refractive index of the uneven pattern substrate 110. In this case, when a difference between the refractive index of the base substrate 10 and the refractive index of the uneven pattern substrate 110 is small, light passing through the first adhesive layer 140 from the base substrate 10 is refracted at a predetermined angle and is refracted in an opposite direction of the predetermined angle while traveling to the uneven pattern substrate 110 again, thereby travelling in a direction similar to an original traveling direction. Of course, when the thickness of the first adhesive layer 140 is very thin, the aforesaid refraction angle may be disregarded.

Moreover, it is preferable for the first adhesive layer 140 to use a material having very low reflection efficiency between the base substrate 10 and the uneven pattern substrate 110. If it is not, a bad influence may be exerted on the generation of a three-dimensional effect beam by the three-dimensional effect forming portion 11.

Accordingly, the present embodiment may provide the lighting device capable of being used to a design lighting device and a flexible application product used in indoor or outdoor general lighting devices, exhibitions and the like and the lighting device capable of expressing optical images having excellent appearance which can be efficiently applied to a lighting device for vehicles and the like.

As set forth above, some embodiments of the present disclosure may provide the optical member capable of implementing optical images having desired shapes by controlling an optical path, an optical width and luminous intensity through a pattern design, and the light device using the optical member.

Also, some embodiments of the present disclosure may provide the optical member capable of converting a single optical image having a three-dimensional effect into multiple optical images having a three-dimensional effect through a pattern design, and the lighting device using the optical member.

As previously described, in the detailed description of the disclosure, having described the detailed exemplary embodiments of the disclosure, it should be apparent that modifications and variations can be made by persons skilled without deviating from the spirit or scope of the disclosure. Therefore, it is to be understood that the foregoing is illustrative of the present disclosure and is not to be construed as limited to the specific embodiments disclosed, and that modifications to the disclosed embodiments, as well as other embodiments, are intended to be included within the scope of the appended claims and their equivalents.

An aspect of embodiments of the present disclosure provides an optical member and a lighting device using the same capable of implementing optical images having a desired shape by controlling an optical path, an optical width and luminous intensity through a pattern design.

Another aspect of embodiment of the present disclosure may provide an optical member and a lighting device using the same capable of converting a single optical image having a three-dimensional effect into a plurality of optical images having the three-dimensional effect through a pattern design and expressing the converted optical images.

In order to solve the above problems, according to an aspect of the present disclosure, an optical member may include: a base substrate; a three-dimensional forming portion provided on a first surface of the base substrate; and a multiple effect forming portion disposed in a lamination shape with three-dimensional effect forming portion. Here, three-dimensional effect forming portion may include multiple main patterns sequentially arranged on the first surface of the base substrate in a first direction and having inclined surfaces with each inclination angle. The multiple main patterns may implement a line-shaped beam of a first path which crosses the respective pattern extension directions of the multiple main patterns by guiding an incident beam into a first surface direction toward which a first surface looks or a second surface direction toward which a second surface opposite to the first surface looks by using refraction and reflection of the respective inclined surfaces. The multiple effect forming portion may be sequentially arranged in a second direction crossing a first direction and may have multiple optical patterns for converting the line shaped beam of the first path into multiple line shaped beams.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lighting device, comprising:
a light source;
a base substrate in which light emitted from the light source is incident;
a three-dimensional effect forming portion disposed on a first surface of the base substrate;
a multiple effect forming portion disposed on a second surface of the base substrate;
wherein the multiple effect forming portion comprises a plurality of optical patterns sequentially arranged in a first direction on the second surface and extended in a second direction which intersects with the first direction,
wherein the three-dimensional effect forming portion comprises a plurality of main patterns sequentially arranged in the second direction on the first surface and extended in the first direction,
wherein the first surface comprises a first region and a second region which are disposed on the first surface,
wherein the plurality of main patterns comprise a first section disposed in the first region and a second section disposed in the second region,
wherein an extension of the first section of the plurality of main patterns and an extension of the second section of the plurality of main patterns intersect each other,
wherein the light source comprises a plurality of first light sources disposed on one side of the base substrate and a plurality of second light sources disposed on another side of the base substrate in the second direction,
wherein the plurality of first light sources are sequentially arranged in the first direction,
wherein the plurality of second light sources are sequentially arranged in the first direction, and
wherein the three-dimensional effect forming portion is disposed between the plurality of first light sources and the plurality of second light sources.

2. The lighting device of claim 1, wherein the light source is embedded in the base substrate.

3. The lighting device of claim 1, wherein each of the plurality of first light sources and each of the plurality of second light sources do not face each other in the second direction.

4. The lighting device of claim 1, wherein the plurality of main patterns extend at a predetermined angle with respect to the first direction to form a zigzag line in a plan view perspective.

5. The lighting device of claim 1, wherein the plurality of main patterns is configured to produce a line shaped beam of a first path crossing at right angles to respective pattern extension directions of the multiple main patterns by guiding a first incident beam into a first surface direction toward which the first surface faces or a second surface direction toward which a second surface of the base substrate opposite to the first surface faces, through refraction or reflection.

6. The lighting device of claim 5, wherein the plurality of optical patterns are configured to convert the line shaped beam of the first path into multiple line shaped beams.

7. The lighting device of claim 1,
wherein at least two of the plurality of optical patterns extend at an angle relative to each other,
wherein the plurality of optical patterns spatially overlap the plurality of main patterns in a plan view perspective, and
wherein the plurality of optical patterns spatially intersect the plurality of main patterns to be perpendicular to each other in the plan view perspective.

8. The lighting device of claim 1, further comprising:
a first adhesive layer disposed between the base substrate and the three-dimensional effect forming portion and
a second adhesive layer disposed between the base substrate and the multiple effect forming portion.

9. The lighting device of claim 8, wherein a refractive index of the first adhesive layer is larger than a refractive index of the base substrate and the three-dimensional effect forming portion.

10. The lighting device of claim 1, wherein the base substrate has a haze of 2% or less.

11. The lighting device of claim 1, wherein the base substrate has a refractive index of 1.30 to 1.80, and wherein an inclined surface of each of the plurality of main patterns is larger than 33.7° and smaller than 50.3°.

12. The lighting device of claim 1, wherein an inclined surface of each of the plurality of main patterns is larger than 23.6° and smaller than 56.3°.

13. The lighting device of claim 12, a rate (h/w) of a width to a height of the main pattern is ½ or less.

14. The lighting device of claim 1, wherein a width in the second direction of the main pattern is in a range of 10 µm to 50 µm.

15. The lighting device of claim 14, wherein the multiple effect forming portion comprises a separation portion disposed between the plurality of main patterns, wherein a width in the second direction of the separation portion is smaller than the width in the second direction of the main pattern.

16. The lighting device of claim 15, wherein the width in the second direction of the separation portion is ⅕ or less of the width in the second direction of the main pattern.

17. A lighting device, comprising:
a light source;
a base substrate in which light emitted from the light source is incident;
a three-dimensional effect forming portion disposed on a first surface of the base substrate;
a multiple effect forming portion disposed on a second surface of the base substrate;
a first adhesive layer disposed between the base substrate and the three-dimensional effect forming portion, and
a second adhesive layer disposed between the base substrate and the multiple effect forming portion,
wherein the multiple effect forming portion comprises a plurality of optical patterns sequentially arranged in a first direction on the second surface and extended in a second direction which intersects with the first direction,
wherein the three-dimensional effect forming portion comprises a plurality of main patterns sequentially arranged in the second direction on the first surface and extended in the first direction,
wherein the first surface comprises a first region and a second region which are disposed on the first surface,
wherein the plurality of main patterns comprise a first section disposed in the first region and a second section disposed in the second region,
wherein an extension of the first section of the plurality of main patterns and an extension of the second section of the plurality of main patterns intersect each other, and
wherein a refractive index of the first adhesive layer is larger than a refractive index of the base substrate and the three-dimensional effect forming portion.

* * * * *